US009443340B2

(12) United States Patent
Miyagi et al.

(10) Patent No.: US 9,443,340 B2
(45) Date of Patent: Sep. 13, 2016

(54) COMPUTER READABLE STORAGE MEDIUM HAVING STORED THEREON IMAGE PROCESSING PROGRAM, IMAGE PROCESSING APPARATUS, IMAGE PROCESSING METHOD, AND IMAGE PROCESSING SYSTEM

(75) Inventors: Atsushi Miyagi, Kyoto (JP); Tomoaki Yoshinobu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 746 days.

(21) Appl. No.: 13/025,576

(22) Filed: Feb. 11, 2011

(65) Prior Publication Data

US 2012/0127158 A1  May 24, 2012

(30) Foreign Application Priority Data

Nov. 18, 2010 (JP) .................................. 2010-258090

(51) Int. Cl.
G06T 15/00 (2011.01)
G06T 13/80 (2011.01)
G06T 15/20 (2011.01)

(52) U.S. Cl.
CPC ............... *G06T 13/80* (2013.01); *G06T 15/20* (2013.01)

(58) Field of Classification Search
None
See application file for complete search history.

(56) References Cited

U.S. PATENT DOCUMENTS

| 2007/0060346 A1* | 3/2007 | Edwards .................... 463/31 |
| 2007/0146360 A1* | 6/2007 | Clatworthy et al. .......... 345/419 |
| 2007/0248283 A1* | 10/2007 | Mack et al. ................. 382/284 |
| 2008/0063294 A1* | 3/2008 | Burt .................. H04N 5/23212 382/255 |
| 2010/0250109 A1* | 9/2010 | Johnston et al. ............. 701/200 |
| 2010/0318914 A1* | 12/2010 | Zitnick et al. ............... 715/719 |

FOREIGN PATENT DOCUMENTS

| JP | 09-6296 | 1/1997 |
| JP | 2005-177033 | 7/2005 |
| JP | 2006-208767 | 8/2006 |
| JP | 2008-108198 | 5/2008 |

OTHER PUBLICATIONS

Schuller, "C# Game Programming: For Serious Game Creation," Jun. 2010, Course Technology PTR, pp. 29-33.*
Shupe, "Learning Flash CS4 Professional," Apr. 2009, O'Reilly Media, Inc., pp. 31-34.*

(Continued)

*Primary Examiner* — Andrew G Yang
(74) *Attorney, Agent, or Firm* — Nixon & Vanderhye P.C.

(57) ABSTRACT

For each layer, a scaling rate of an object image or a background image belonging to each of the layers is calculated based on a distance from a predetermined reference point in a virtual three-dimensional space to each of the layers. In addition, for each of the layers, a movement velocity of each of the layers when conducting a parallax scrolling is calculated based on a distance from the predetermined reference point in the virtual three-dimensional space to each of the layers. Furthermore, an image in each of the layers is scaled up or down based on the calculated scaling rate, and each of the layers are moved in a predetermined direction at the calculated movement velocity.

14 Claims, 14 Drawing Sheets

(56) References Cited

OTHER PUBLICATIONS

Pile, Jr., "2D Graphics Programming for Games," May 2013, A K Peters/CRC Press, p. 103.*

"How to recreate Silverback's parallax effect" [online], Annett, Feb. 2008 [retrieved Mar. 14, 2016], retrieved from the internet: <URL: http://blog.teamtreehouse.com/how-to-recreate-silverbacks-parallax-effect>.*

* cited by examiner

COMPUTER READABLE STORAGE MEDIUM HAVING STORED THEREON IMAGE PROCESSING PROGRAM, IMAGE PROCESSING APPARATUS, IMAGE PROCESSING METHOD, AND IMAGE PROCESSING SYSTEM

CROSS REFERENCE TO RELATED APPLICATION

The disclosure of Japanese Patent Application No. 2010-258090, filed Nov. 18, 2010, is incorporated herein by reference.

BACKGROUND

1. Technical Field

The technology presented herein relates to an image processing using the orthographic projection method, and more specifically, relates to a parallax scrolling control and a scaling process conducted in an image processing using the orthographic projection method.

2. Description of the Background Art

Conventionally, as a method to express depth perception and a sense of perspective, a display method that conducts so called parallax scrolling has been known (for example, Japanese Laid-Open Patent Publication No. H09-6296). This display method is a method that envisions a two-dimensional image processing. On the other hand, game systems that conduct a three-dimension displaying process for a game screen are commonly used in recent years. Generally, in such game systems, character objects and various structures, which are respectively arranged in pre-determined coordinate positions, are used as display objects in a game field set in a virtual three-dimensional space; and a viewpoint position and a gazing point are set so as to define a display range of the game screen, and a game image which is taken using a perspective projection method is displayed.

The technology disclosed in the above described Japanese Laid-Open Patent Publication No. H09-6296 is a process that envisions processing in two dimensions, and is not a technology that envisions a virtual three-dimensional space. On the other hand, when the perspective projection method described above is used, depth perception can be expressed without conducting a parallax scrolling. Therefore, a technology that anticipates and envisions a parallax scrolling using the so-called orthographic projection method has not been known. In particular, a technology that anticipates and envisions an image processing which conducts a parallax scrolling control and additionally conducts scaling up or down of a screen using the orthographic projection method has not been known.

SUMMARY

Therefore, a feature of the present technology is to provide an image processing program capable of producing an expression with a sense of perspective with less sense of incongruity, when conducting an image processing using the orthographic projection method, a parallax scrolling control, and scaling process of a screen.

In order to achieve the above described feature, the present technology has adopted the following configuration.

An image processing program, which is stored on a computer readable storage medium which is one aspect of the present technology, is an image processing program executed on a computer of an image processing apparatus which displays an image obtained by orthographic projection transformation of a virtual three-dimensional space configured and arranged with a plurality of layers which are each scrolling control targets for a parallax scrolling. The image processing program causes the computer to function as layer scaling rate calculating means, layer movement velocity calculating means, and layer controlling means. The layer scaling rate calculating means calculates, for each of the layers, a scaling rate of an object image or a background image belonging to each of the layers, in accordance with a distance from a predetermined reference point in the virtual three-dimensional space to each of the layers. The layer movement velocity calculating means calculates, for each of the layers, a movement velocity of each of the layers when conducting the parallax scrolling, based on a distance from the predetermined reference point in the virtual three-dimensional space to each of the layers. The layer controlling means scales, up or down, an image in each of the layers based on the scaling rate calculated by the layer scaling rate calculating means, and moves each of the layers in a predetermined direction at the movement velocity calculated by the layer movement velocity calculating means.

With the above described configuration, a simulated expression with a sense of perspective can be conducted while mitigating unnatural displays, when an image processing using the orthographic projection method is conducted and when the parallax scrolling and scaling a screen are both to be achieved.

In another configurational example, the layer movement velocity calculating means may calculate the movement velocity such that a layer arranged closer to the predetermined reference point has a faster movement velocity.

Furthermore, in another configurational example, the layer movement velocity calculating means may calculate the movement velocity such that a layer arranged closer to the predetermined reference point has a faster movement velocity and such that a layer arranged farther from the predetermined reference point has a slower movement velocity.

With the above described configurational example, the sense of perspective can be further emphasized.

Furthermore, in another configurational example, the layer scaling rate calculating means may calculate the scaling rate such that a layer arranged closer to the predetermined reference point has a larger scaling rate when being scaled-up or a smaller scaling rate when being scaled-down.

With the above described configurational example, an expression with a sense of perspective with less sense of discomfort will be possible even though it is simulated.

Furthermore, in another configurational example, the layer scaling rate calculating means may calculate the scaling rate such that a layer arranged closer to the predetermined reference point is further scaled up and such that a layer arranged farther from the predetermined reference point is further scaled down.

With the above described configurational example, an expression with a sense of perspective with less sense of discomfort will be possible.

Furthermore, in another configurational example: the image processing program may further cause the computer to function as reference point moving means for moving the predetermined reference point in one predetermined direction or for assuming that the predetermined reference point has been moved in one predetermined direction, if a predetermined condition based on an operation by an operator is satisfied; the layer scaling rate calculating means may calculate the scaling rate based on a distance from each of the layers to a position of the predetermined reference point moved by the reference point moving means or to a position of the predetermined reference point which is assumed to have been moved; and the layer movement velocity calculating means may calculate the movement velocity of each of the layers based on a distance from each of the layers to the position of the predetermined reference point moved by the reference point moving means or to a position of the predetermined reference point which is assumed to have been moved.

With the above described configurational example, a simulated expression with a sense of perspective can be conducted with less sense of discomfort, even when an image processing using the orthographic projection method is conducted, and when the parallax scrolling and scaling a screen are both to be achieved.

Furthermore, in another configurational example: a depth value which indicates a position of each of the layers in the virtual space on an axis in one predetermined direction from the predetermined reference point may be configured; the layer scaling rate calculating means may calculate the scaling rate of the object image or the background image based on the depth value; and the layer movement velocity calculating means may calculate the movement velocity of each of the layers based on the depth value.

With the above described configurational example, process for calculating the movement velocity of each of the layers can be conducted as an easy process.

Furthermore, in another configurational example, an image processing executed by the image processing apparatus is a process capable of moving an object to an end of a display area which is an area in which an image is displayed.

With the above described configurational example, a game which allows a delicate feel of operation while conducting an expression with a sense of perspective but without a sense of discomfort by using the orthographic projection method can be provided.

Furthermore, in another configurational example: a virtual camera is arranged at the predetermined reference point; the layer scaling rate calculating means calculates the scaling rate in accordance with a distance from the virtual camera to each of the layers; and the layer movement velocity calculating means calculates the movement velocity of each of the layers based on the distance from the virtual camera to each of the layers.

With the above described configurational example, a simulated expression with a sense of perspective can be conducted while mitigating unnatural displays, when an image processing using an orthographic projection camera is conducted and when the parallax scrolling and scaling a screen are both to be achieved.

Furthermore, in another configurational example, the image processing program may further cause the computer to function as object side-surface generating means for changing, when an object that belongs to a layer approaches an end of a display area in which an image is displayed, an image of the object such that a side surface of the object is displayed.

With the above described configurational example, an expression with a sense of perspective with a lesser sense of discomfort is possible.

Furthermore, in another configurational example, the object belonging to the layer is a 3D model object, and the object side-surface generating means transforms the object such that a side surface portion of the object is displayed, or rotates the object along a movement direction of the layer such that a side surface of the object is displayed.

With the above described configurational example, a side surface of the object can be generated as a relatively easy process.

An image processing apparatus, which is one aspect of the present technology, is an image processing apparatus which displays an image obtained by orthographic projection transformation of a virtual three-dimensional space configured and arranged with a plurality of layers which are each scrolling control targets for a parallax scrolling; and the image processing apparatus includes a layer scaling rate calculation section, a layer movement velocity calculation section, and a layer control section. The layer scaling rate calculation section calculates, for each of the layers, a scaling rate of an object image or a background image belonging to each of the layers, in accordance with a distance from a predetermined reference point in the virtual three-dimensional space to each of the layers. The layer movement velocity calculation section calculates, for each of the layers, a movement velocity of each of the layers when conducting the parallax scrolling, based on a distance from the predetermined reference point in the virtual three-dimensional space to each of the layers. The layer control section scales, up or down, an image in each of the layers based on the scaling rate calculated by the layer scaling rate calculation section, and moves each of the layers in a predetermined direction at the movement velocity calculated by the layer movement velocity calculation section.

With the above described configuration, a simulated expression with a sense of perspective can be conducted, even when an image processing using the orthographic projection method is conducted, and when the parallax scrolling and scaling a screen are both to be achieved.

An image processing method, which is one aspect of the present technology, is an image processing method for displaying an image obtained by orthographic projection transformation of a virtual three-dimensional space configured and arranged with a plurality of layer which are each scrolling control targets for a parallax scrolling; and the image processing method includes a layer scaling rate calculation step, a layer movement velocity calculation step, and a layer control step. The layer scaling rate calculation step is a step of calculating, for each of the layers, a scaling rate of an object image or a background image belonging to each of the layers, in accordance with a distance from a predetermined reference point in the virtual three-dimensional space to each of the layers. The layer movement velocity calculation step is a step of calculating, for each of the layers, a movement velocity of each of the layers when conducting the parallax scrolling, based on a distance from the predetermined reference point in the virtual three-dimensional space to each of the layers. The layer control step is a step of scaling, up or down, an image in each of the layers based on the scaling rate calculated at the layer scaling rate calculation step, and moving each of the layers in a predetermined direction at the movement velocity calculated at the layer movement velocity calculation step.

With the above described configuration, a simulated expression with a sense of perspective can be conducted even when an image processing using the orthographic projection method is conducted, and when the parallax scrolling and scaling a screen are both to be achieved.

An image processing system, which is one aspect of the present technology, is an image processing system which displays an image obtained by orthographic projection transformation of a virtual three-dimensional space configured and arranged with a plurality of layers which are each scrolling control targets for a parallax scrolling; and the image processing system includes a layer scaling rate calculation section, a layer movement velocity calculation section, and a layer control section. The layer scaling rate calculation section calculates, for each of the layers, a scaling rate of an object image or a background image belonging to each of the layers, in accordance with a distance from a predetermined reference point in the virtual three-dimensional space to each of the layers. The layer movement velocity calculation section calculates, for each of the layers, a movement velocity of each of the layers when conducting the parallax scrolling, based on a distance from the predetermined reference point in the virtual three-dimensional space to each of the layers. The layer control section scales, up or down, an image in each of the layers based on the scaling rate calculated by the layer scaling rate calculation section, and moves each of the layers in a predetermined direction at the movement velocity calculated by the layer movement velocity calculation section.

With the above described configuration, a simulated expression with a sense of perspective can be conducted, even when an image processing using the orthographic projection method is conducted, and when the parallax scrolling and scaling a screen are both to be achieved.

With the present technology, a simulated expression with a sense of perspective can be produced with a less sense of discomfort in an image processing using the orthographic projection method.

These and other features, aspects and advantages of the present technology will become more apparent from the following detailed description of the present technology when taken in conjunction with the accompanying drawings.

DESCRIPTION OF THE PREFERRED EMBODIMENTS (Overall Configuration of Game System)

Figure 1:
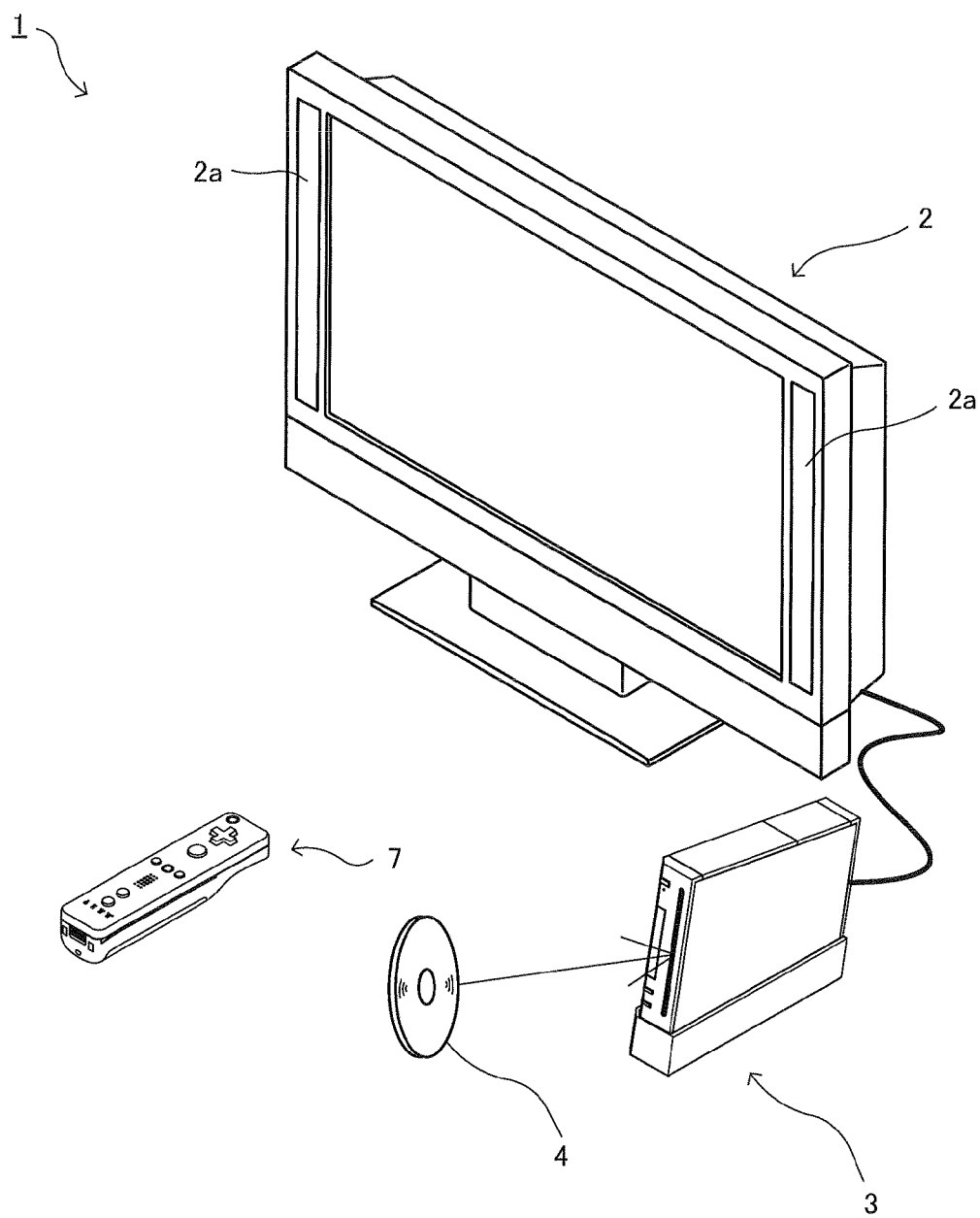
FIG. 1 is an exterior view of a game system 1.

A game system 1 including a game apparatus according to an embodiment will be described with reference to FIG. 1. FIG. 1 is an exterior view of the game system 1. In the following, the game apparatus and the game program of the present embodiment will be described by using a stationary game apparatus as an example. As shown in FIG. 1, the game system 1 includes a television receiver (hereinafter, referred to simply as "television") 2, a game apparatus 3, an optical disc 4, and a controller 7. In the present system, a game process is executed on the game apparatus 3 based on a game operation using the controller 7.

The optical disc 4, which is one example of exchangeable information storage medium used for the game apparatus 3, is detachably inserted in the game apparatus 3. A game program which is executed on the game apparatus 3 is stored on the optical disc 4. An insertion opening for the optical disc 4 is provided on the front surface of the game apparatus 3. The game process is executed by having the game apparatus 3 read-out and execute the game program stored on the optical disc 4 inserted through the insertion opening.

The game apparatus 3 is connected to the television 2, which is one example of a display device, via a connecting cord. The television 2 displays a game image obtained as a result of the game process executed by the game apparatus 3.

The controller 7 is an input device which provides the game apparatus 3 with operation data representing a content of an operation conducted on the controller 7 itself. The controller 7 and the game apparatus 3 are connect via wireless communication. In the present embodiment, for example, technologies such as Bluetooth (registered trademark) are used as the wireless communication between the controller 7 and the game apparatus 3. Note that, in another embodiment, the controller 7 and the game apparatus 3 may be connected via a wired connection.

(Internal Configuration of Game Apparatus 3)

Figure 2:
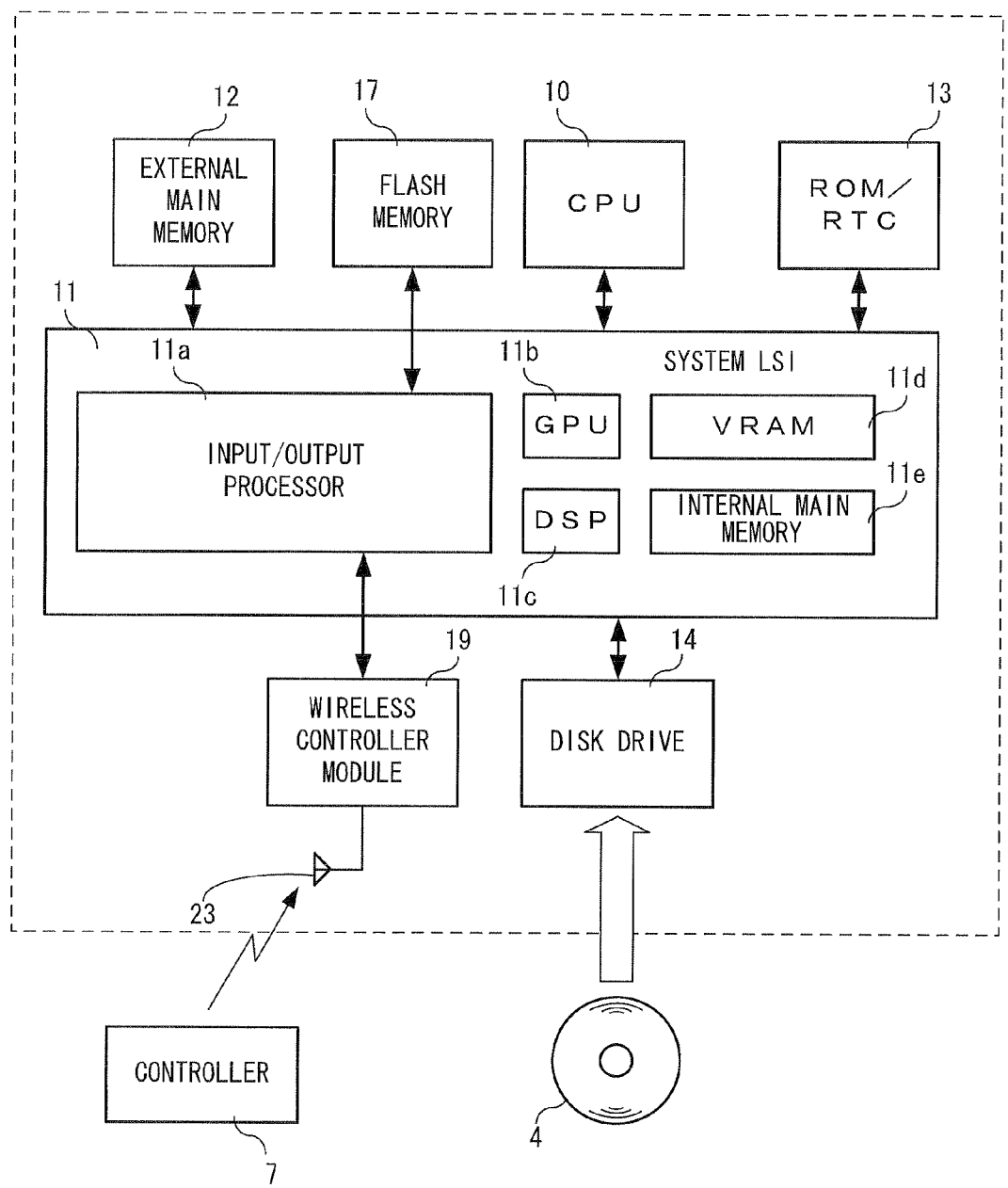
FIG. 2 is a block diagram showing a configuration of a game apparatus 3.

Next, with reference to FIG. 2, the internal configuration of the game apparatus 3 will be described. FIG. 2 is a block diagram showing a configuration of the game apparatus 3. The game apparatus 3 includes a CPU 10, a system LSI 11, an external main memory 12, a ROM/RTC 13, a disk drive 14, and the like.

The CPU 10 executes the game process by executing the game program stored on the optical disc 4, and functions as a game processor. The CPU 10 is connected to the system LSI 11. Other than the CPU 10, the external main memory 12, the ROM/RTC 13, and the disk drive 14 are connected to the system LSI 11. The system LSI 11 conducts processes such as control of data transfer between each configuration element connected to it, generation of images that should be displayed, acquisition of data from external devices, and the like. The internal configuration of the system LSI 11 will be described later. The external main memory 12, which is a volatile memory, stores game programs read-out from the optical disc 4, programs such as a game program read-out from a flash memory 17, and various data. The external main memory 12 is used as work area and buffer area for the CPU 10. The ROM/RTC 13 includes a ROM (so-called boot ROM) having incorporated thereon a program for starting up the game apparatus 3, and a clock circuit (RTC: Real Time Clock) for counting time. The disk drive 14 reads-out program data, texture data, and the like from the optical disc 4, and writes the read-out data in a later described internal main memory 11e or the external main memory 12.

Furthermore, the system LSI 11 is provided with an input/output processor (I/O processor) 11a, a GPU (Graphics Processor Unit) 11b, a DSP (Digital Signal Processor) 11c, a VRAM 11d, and the internal main memory 11e. Although not shown, these configuration elements 11a to 11e are connected to each other via an internal bus.

The GPU 11b, which constitutes a part of drawing means, generates an image in accordance with a graphics command (drawing generation order) from the CPU 10. More specifically, the GPU 11b generates game image data by performing, in accordance with the graphics command, a calculation process that is necessary for displaying 3D graphics. The calculation process includes coordinate transformation from 3D coordinates to 2D coordinates, which is a pre-processing step of rendering, and the application of a texture, which is a final process of rendering. Here, the CPU 10 provides the GPU 11b with an image generation program that is necessary for generating the game image data, as well as the graphics command. The VRAM 11d stores thereon data (data such as polygon data and texture data) necessary for the GPU 11b to execute the graphics command. When an image is to be generated, the GPU 11b generates image data by using the data stored on the VRAM 11d.

The DSP 11c functions as an audio processor, and generates audio data by using sound data and sound waveform (tone) data stored on the internal main memory 11e and the external main memory 12. Similarly to the external main memory 12, the internal main memory 11e stores programs and various data, and is used as work area and buffer area for the CPU 10.

As described above, the generated image data and audio data are read-out by an AV-IC which is not shown. The AV-IC outputs the read-out image data to the television 2, and outputs the read-out audio data to a loudspeaker 2a built into the television 2. Thus, images are displayed on the television 2 and sound is outputted from the loudspeaker 2a.

The input/output processor 11a transmits and receives data among configuration elements connected thereto, and downloads data from an external device. The input/output processor 11a is connected to the flash memory 17 and a wireless controller module 19. The wireless controller module 19 is connected to an antenna 23.

The input/output processor 11a receives operation data transmitted from the controller 7 via the antenna 23 and the wireless controller module 19, and stores (temporarily stores) it in the buffer area of the internal main memory 11e or the external main memory 12.

Figure 3:
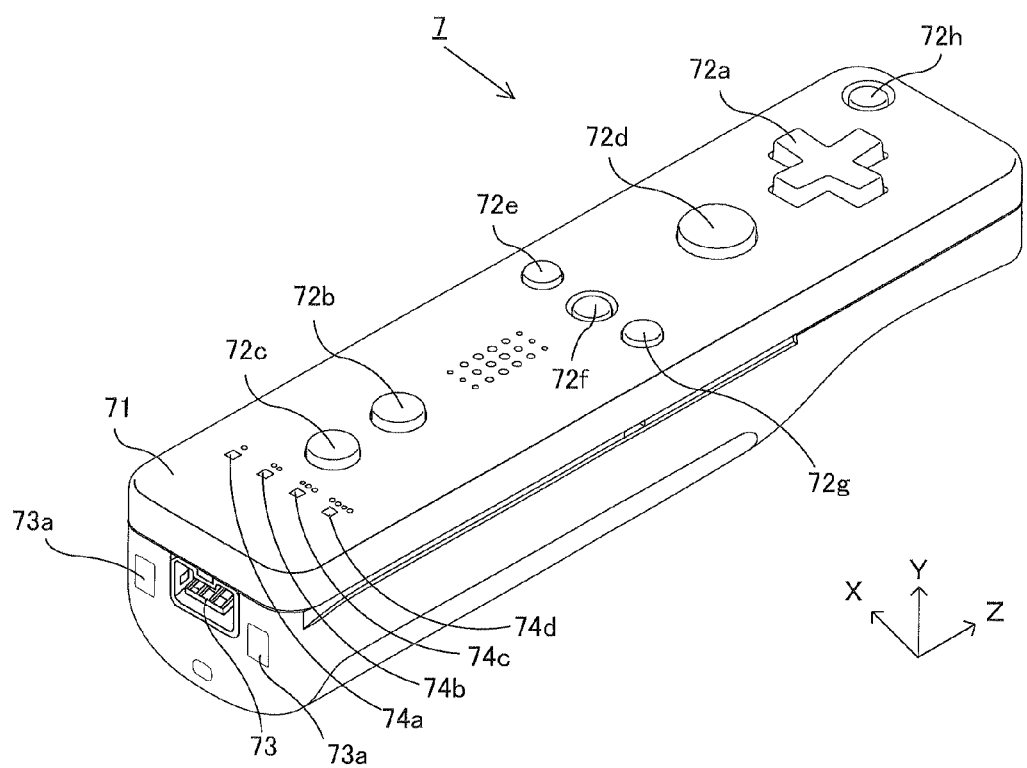
FIG. 3 is a perspective diagram showing an external configuration of a controller 7.

Next, with reference to FIG. 3, the controller 7 will be described. FIG. 3 is a perspective diagram obtained when the top surface of controller 7 is viewed from the rear.

In FIG. 3, the controller 7 includes a housing 71, and an operation section 72 having a plurality of operation buttons disposed on the surface of the housing 71. The housing 71 of the present embodiment has a generally parallelepiped shape extending in a longitudinal direction from front to rear. The overall size of the housing 71 is small enough to be held by one hand of an adult or even a child, and the housing 71 is formed by, for example, plastic molding.

At the center of the front portion of the top surface of the housing 71, a cross key 72a is provided. The cross key 72a is a cross-shaped four-direction push switch. The cross key 72a includes operation sections corresponding to the four directions (front, rear, right, and left), which are located on cross-shaped projecting portions, respectively, arranged at intervals of 90 degrees. A player selects a direction of front, rear, right, or left by pressing either one of the operation sections of the cross key 72a. Through an operation on the cross key 72a, the player can, for example, indicate a direction in which a player character or the like appearing in a virtual game world is to move, or instruct to select one among a plurality of options.

Behind the cross key 72a on the top surface of the housing 71, a plurality of operation buttons 72b, 72c, 72d, 72e, 72f, and 72g are provided. The operation buttons 72b, 72c, 72d, 72e, 72f, and 72g are each an operation section for, when the player presses a head thereof, outputting a corresponding operation signal. For example, functions for No. 1 button, No. 2 button, and A button are assigned to the operation buttons 72b, 72c, and 72d. Furthermore, functions for minus button, home button, and plus button are assigned to the operation buttons 72e, 72f, and 72g. Various operational functions in accordance with the game program executed by the game apparatus 3 are assigned to the operation buttons 72a, 72b, 72c, 72d, 72e, 72f, and 72g.

In addition, in front of the cross key 72a on the top surface of the housing 71, an operation button 72h is provided. The operation button 72h is a power switch for remote-controlling the power of the game apparatus 3 itself to be on or off.

Behind the operation button 72c on the top surface of the housing 71, multiple LEDs 702 are provided. Here, a controller type (number) is assigned to the controller 7 such that the controller 7 is distinguishable from the other controllers 7. For example, LEDs 74a to 74d are used for notifying the player of the controller type currently assigned to the controller 7. Specifically, when transmitting transmission data from the controller 7 to the game apparatus 3, among the plurality of LEDs 74a to 74d and depending on the controller type, an LED that corresponds to the controller type lights up.

On the top surface of the housing 71 and between the operation button 72b and the operation buttons 72e to 72g, sound holes are provided in order to externally release sound originating from a loudspeaker.

A recessed portion is formed on the bottom surface of the housing 71. The recessed portion on the bottom surface of the housing 71 is formed in a position at which an index finger or middle finger of the player is located when the player holds the controller 7 with one hand and points a front portion thereof to the television 2. On a slope surface of the recessed portion, an operation button 72i is provided (not show). The operation button 72i is an operation section that functions as, for example, B button.

An operation signal (key data) outputted from the operation section 72 disposed on the controller 7 is transmitted to the wireless controller module 19. Wireless transmission from the controller 7 to the wireless controller module 19 is conducted periodically at a predetermined cycle. Since game processes are generally conducted at a cycle of 1/60 seconds, it is necessary to conduct the transmission at a shorter cycle. The CPU 10 of the game apparatus 3 conducts game processes based on the game program and operation information acquired via the wireless controller module 19 of the game apparatus 3.

(General Outline of Game Process)

Figure 4:
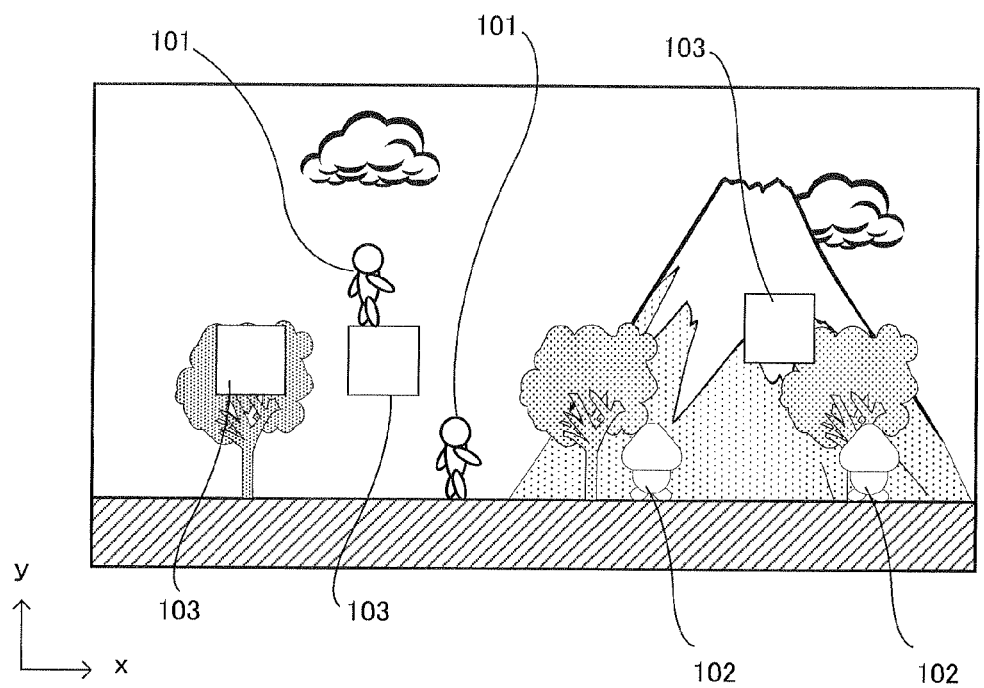
FIG. 4 is one example of a game screen envisioned by the present embodiment.
Figure 5:
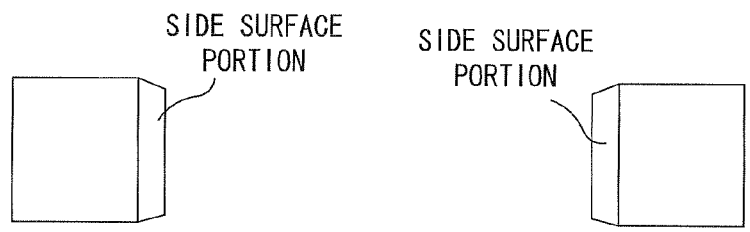
FIG. 5 is a figure showing a side surface portion of a block.

Next, a general outline of the game envisioned by the present embodiment will be described by using FIG. 4 to FIG. 15. The game envisioned by the present embodiment is a so-called jumping action game. In addition, simultaneous playing by multiple players is possible in this game. FIG. 4 is one example of a screen of the game envisioned by the present embodiment. The game screen is an image of a three-dimensional virtual game space projected by the orthographic projection method (in other words, an image taken by an orthographic projection camera). Various background objects such as a tree and a mountain, and background images indicating the sky and clouds are displayed on the game screen, in addition to a plurality of player characters 101, an enemy character 102, and a block 103. Hereinafter, these various characters, objects, and background images which appear in the game are referred to by a collective term of "drawing models". Each the drawing models that appear in the game is obtained by being modeled as a 3D model. In the present game, each of the player characters can be moved to an end of the screen. Thus, with regard to movement range in a screen-coordinates system, the player characters can move within the entire displayed range.

The orthographic projection method is used in the game envisioned by the present application in order to provide the player with a delicate feel of operation at a dot scale for the jumping action game of the present game. When the block 103 is used as an example, if the perspective projection method used in a general 3D game is adopted, there are cases where a side surface portion of the block, which is a 3D model, will be displayed (refer to FIG. 5). However, in a situation where a jump is about to be attempted from a certain block to another block at a mode in which such side surface portion is visible, the player has difficulty in grasping the timing for the jump or a sense of distance to a landing point. This results in a deteriorated operability. On the other hand, if the orthographic projection method is used, since the block is displayed in a mode where the front surface thereof is facing the player, the player can easily grasp the timing for the jump and the sense of distance, and can also conduct fine adjustments at a dot scale for the takeoff position of the jump and the like. As a result, a jumping action game with a delicate feel of operation can be provided.

In addition to providing a delicate feel of operation using the orthographic projection method, a simulated depth perception is expressed in this game by utilizing a parallax scrolling which uses multiple layers.

Figure 6:
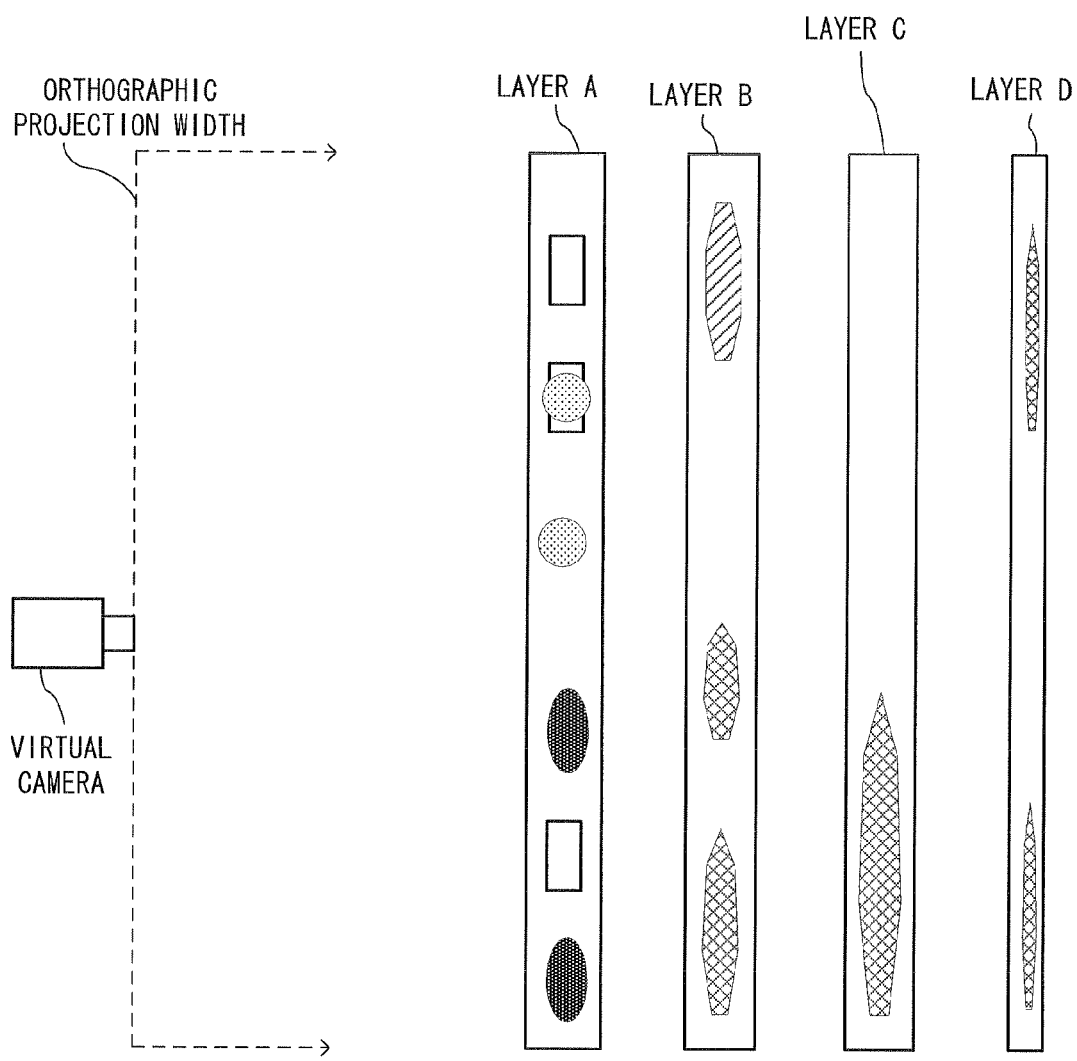
FIG. 6 is a figure for describing layers.
Figure 7:
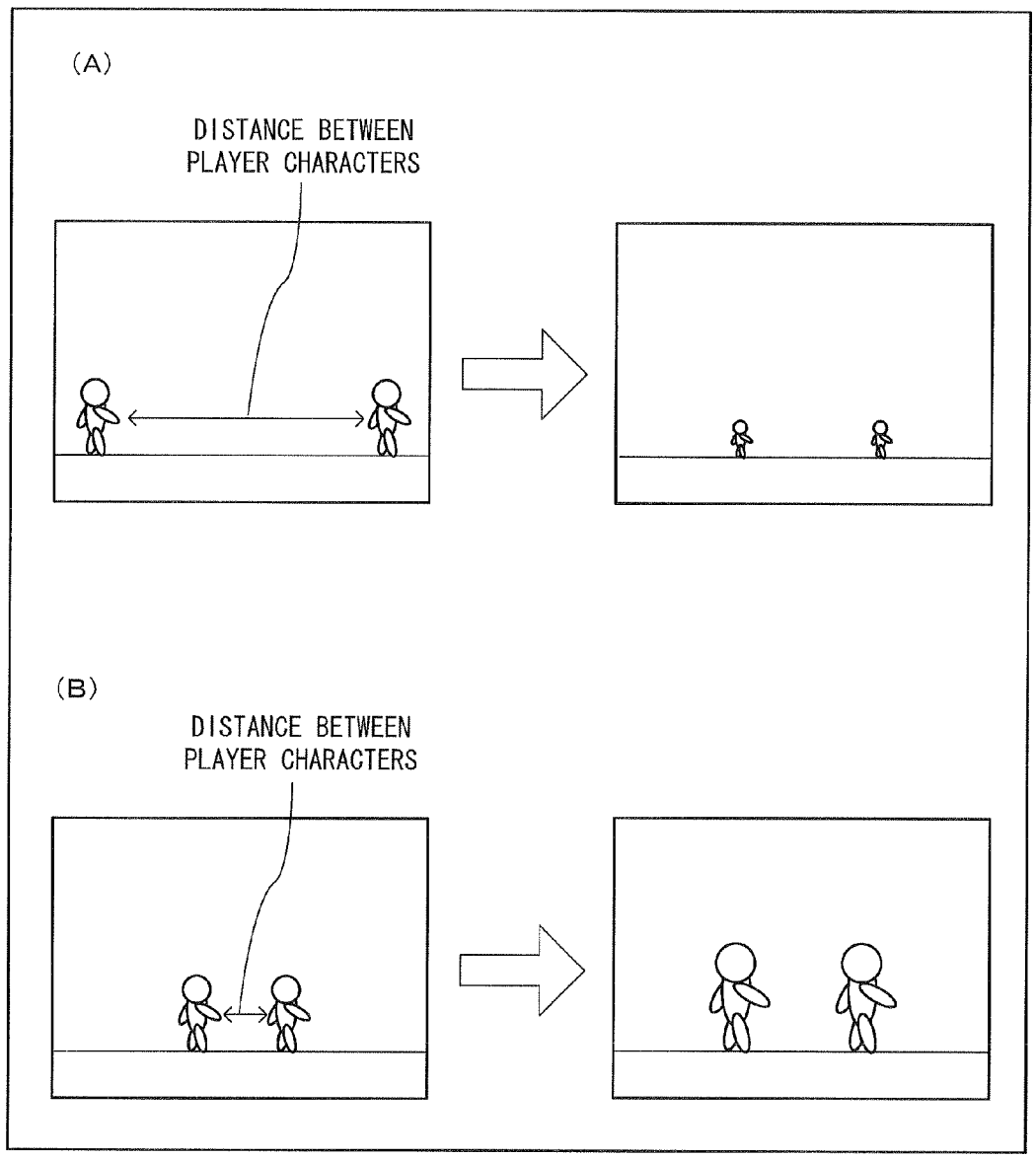
FIG. 7 is a figure for describing scaling.

Here, the layers of the present embodiment will be described. FIG. 6 is a figure for describing the layers. In FIG. 6, layer A to layer D are arranged side by side along a direction in which the virtual camera of the orthographic projection method takes an image, Layer A is arranged at the closest position from the virtual camera, and layer D is arranged at the farthest position from the virtual camera. A plurality of drawing models belong to (are arranged in) each of the layers.

The player characters 101, the enemy character 102, the block 103, and the like are arranged in layer A. Therefore, models directly involved in game play are arranged in layer A. Furthermore, collision determination settings are configured for each of the models arranged in layer A. Hereinafter, layer A to which the player characters belong may be referred to as a "standard layer". Each of the drawing models belonging to layer A is obtained by being modeled as a 3D model as described above. However, the drawing models are displayed as images obtained when those are viewed constantly from a certain angle (front), since a projective transformation is conducted by using the orthographic projection method as described above.

Layer B is a layer defined as being at a distance farther from layer A but closer to layer C when viewed from the virtual camera. In the example in FIG. 6, trees, which are background objects, belong to layer B. Layer C is a layer defined as being positioned at a distance even farther from layer B but closer to the virtual camera than layer D. A mountain, which is a background object, belongs to layer C. Each of the drawing models that belong to layers B and C are also generated by being modeled as 3D models. However, since these models are defined as merely backgrounds, they do not have collision determination settings. Layer D is a layer defined as being at a distance farthest from the virtual camera. Thus, layer D includes images at the very back, and the background image of the sky (drawing model generated by pasting a scenery texture of sky onto a large plate-shaped polygon) belongs to layer D.

The parallax scrolling is achieved by conducting scrolling control on each of the above described layers, layer by layer. In addition, scaling, which is described later, is also conducted on each of the layers.

As described above, in the present game, the player characters 101 can be moved to an end of the screen, and simultaneous playing by multiple players is also possible. Therefore, when the plurality of player characters 101 are moving toward different ends of the screen, there are cases where operations of the player characters become difficult. In order to provide a comfortable play sensation even in such cases, in the present game, when the distance between operated player characters becomes large, a scale-down displaying is performed to enable a broader range to be displayed (refer to FIG. 7(A)). On the other hand, when the player characters come closer to each other beyond a certain degree (when the distance between the player characters becomes small to a certain degree), scaling up of the screen is conducted to provide a comfortable play sensation (refer to FIG. 7(B)).

Figure 8:
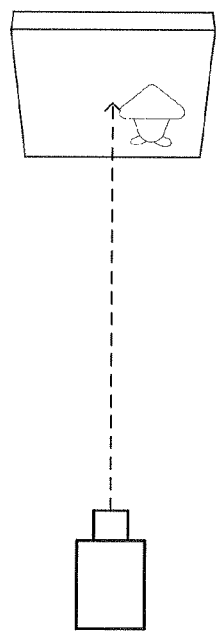
FIG. 8 is a figure for describing scaling.
Figure 9:
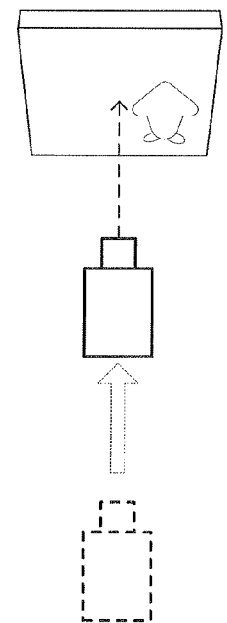
FIG. 9 is a figure for describing scaling.
Figure 10:
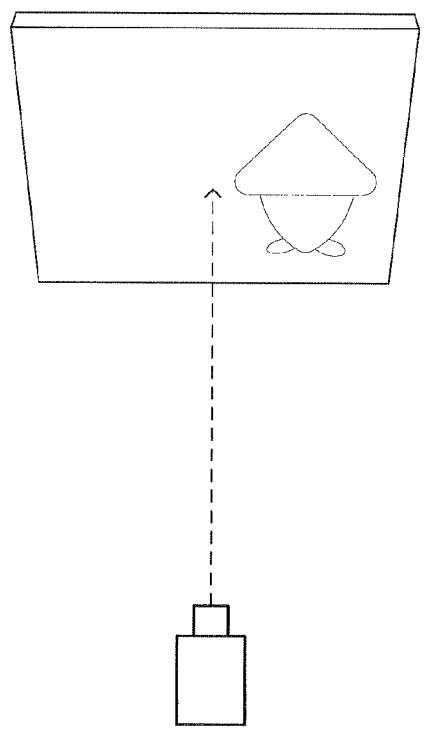
FIG. 10 is a figure for describing scaling.

Here, processing technique for the scaling in the present game will be described. As described above, the orthographic projection method is used in the present game. Therefore, a method of generating a game image by moving the virtual camera in the virtual space (change the position of the virtual camera) is not conducted, as it is the case with the perspective projection method (scaling is not conducted in the orthographic projection method even when the virtual camera is moved). In the present game, instead of changing the position of the virtual camera, an effect that gives an impression as if the virtual camera has moved, which is as if the virtual camera has moved-in (zoomed-in) or pulled-out (zoomed-out), is made possible, by scaling up or scaling down each of the layers (more precisely, scaling up or scaling down each of the drawing models belonging to each of the layers). More specifically, for example, when scaling-up is conducted in a state as shown in FIG. 8, a case in which the virtual camera has moved into a predetermined distance is assumed (simulated) as shown in FIG. 9, and then a distance between the virtual camera and a layer resulting from this simulation is calculated. Next, based on this distance, a scaling rate of the layer is determined. Then, as shown in FIG. 10, the layer is scaled up without actually moving the position of the virtual camera in the virtual game space. With this, an expression as if the virtual camera being "moved-in" (zoomed-in) is conducted.

As described above, in the present game, a scaling process is conducted as appropriate during the game process, in addition to the parallax scrolling using multiple layers. When conducting such processes, a method of individually managing parameters for the parallax scrolling control (specifically, amount of scrolling or scrolling velocity) and parameters for scaling the screen is conceivable. For example, there can be a case where the scaling rate is dynamically changed depending on the distance between the player characters, while the scrolling of each of the layers is conducted at a predefined scrolling velocity.

However, when the parameters for scrolling and the parameters for scaling are individually managed, there are cases where a distance from a long-distance view to a short-distance view in a depth direction for parallax scrolling (that is, a distance between each of the layers in the depth direction) is not taken into consideration when conducting the scaling. For example, assume a case where there are two layers, a first layer (short-distance view) and a second layer (long-distance view). In this case, the ratio of the scrolling velocity of these layers are controlled at a velocity ratio of (first layer:second layer)=(2:1). If scaling up as described above is conducted in this case, there can be a case where the first layer is scaled up by 4 times, but the second layer is scaled up by 1.8 times. Thus, as a result of the scaling rate being calculated with no relationship with the scrolling velocity, a mismatch can be generated for the ratio of the scrolling velocities of the short-distance view and the long-distance view, and for the ratio of the scaling rates of the short-distance view and the long-distance view. Such a case may result in an unstable behavior of the parallax scrolling behavior due to influences such as calculation error and the like for the scrolling control (amount of layer movement per one frame becoming erratic).

Figure 11:
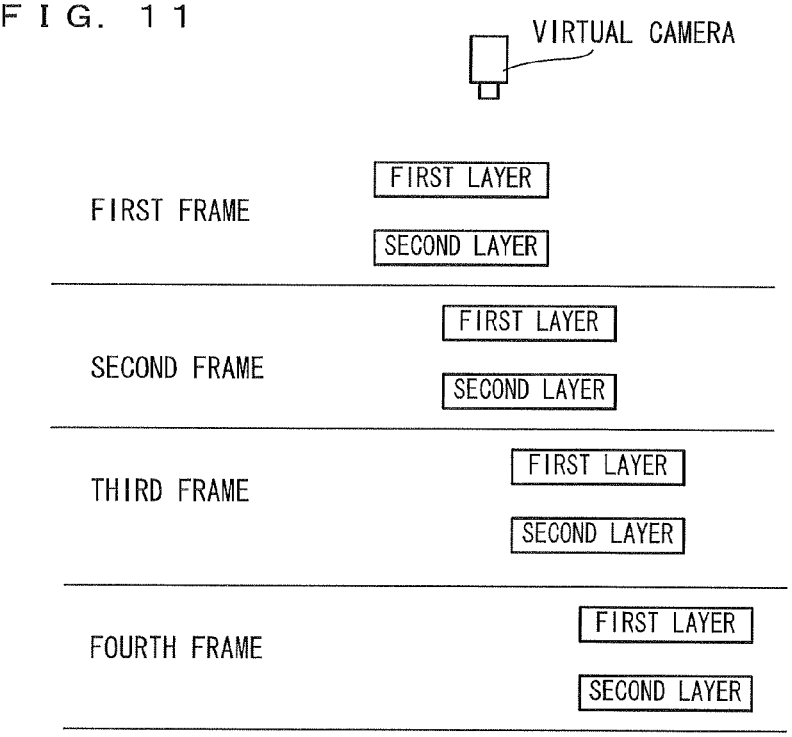
FIG. 11 is a figure schematically showing the manner how parallax scrolling is conducted.

FIG. 11 is a figure schematically showing the manner how scrolling of the first layer and the second layer is conducted when scaling up or scaling down is not conducted. FIG. 11 shows the manner how the first layer and the second layer are moving "in a matching pace" from the first frame to the fourth frame. In other words, the amount of movement per one frame is constant.

Figure 12:
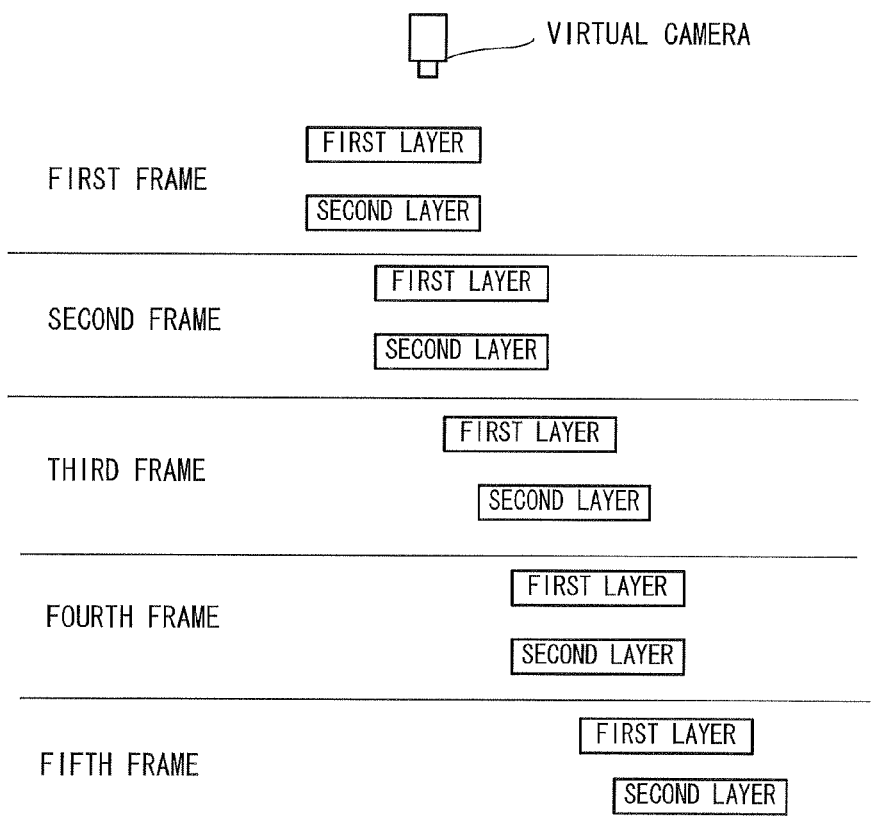
FIG. 12 is a figure schematically showing the manner how parallax scrolling is conducted.
Figure 13:
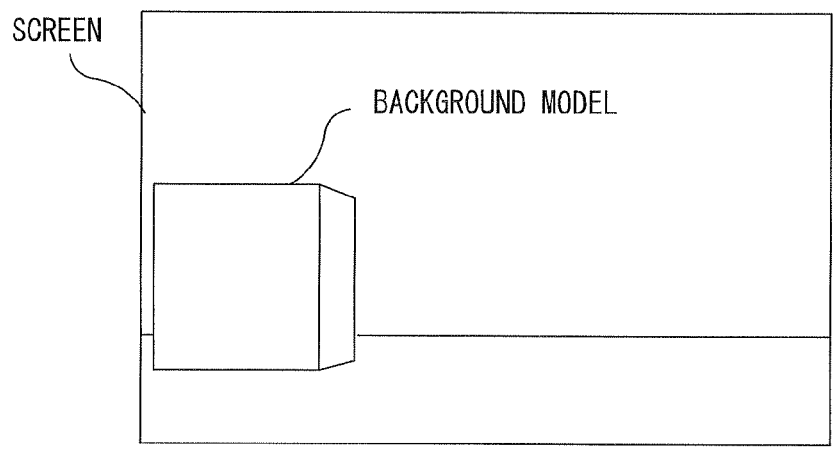
FIG. 13 is an example of rotation or transformation of a drawing model.
Figure 14:
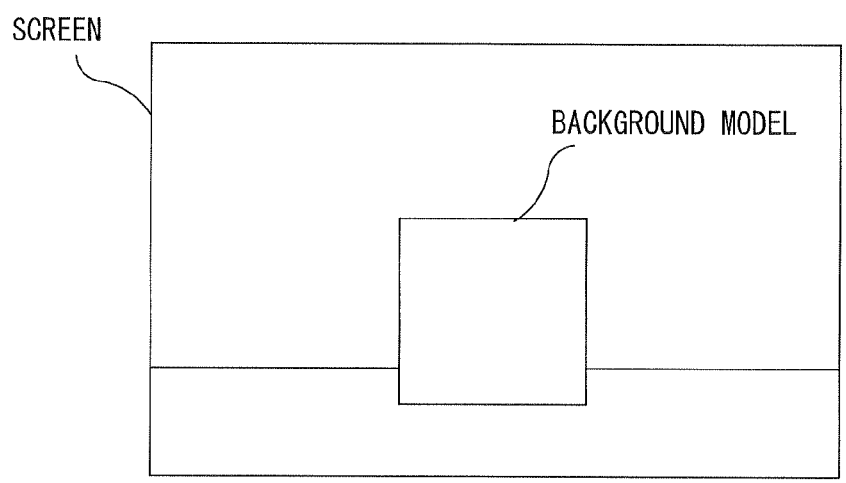
FIG. 14 is an example of rotation or transformation of a drawing model.
Figure 15:
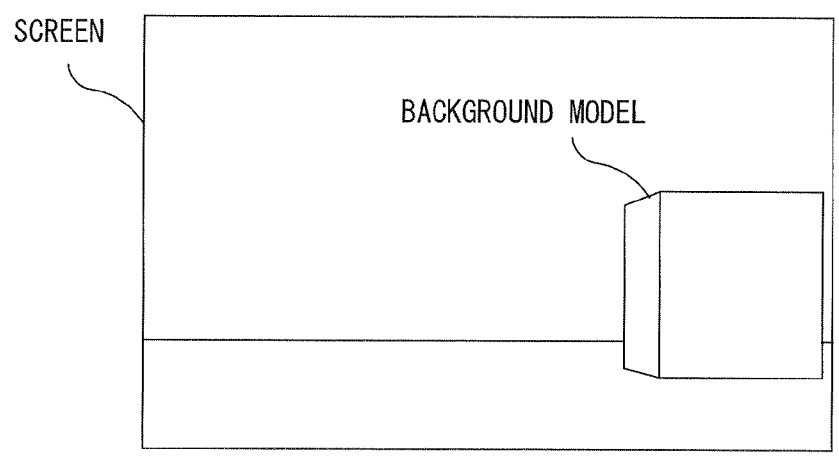
FIG. 15 is an example of rotation or transformation of a drawing model.

On the other hand, FIG. 12 is a figure schematically showing the manner how scrolling is conducted when scaling up is performed in a state where there is a mismatch between the ratio of the scrolling velocities and scaling rates. In FIG. 12, the amount of movement per one frame of the second layer is not constant, and the second layer has overtaken the first layer in the third frame and the fifth frame. Thus, the scrolling velocity (amount of scrolling) of the second layer is unstable. As a result, when a scaling-up display is conducted, there are cases where a parallax scrolling having unstable movement is displayed instead of a smooth parallax scrolling.

Therefore, in the present embodiment, the scaling and parallax scrolling control are conducted by performing a process that prevents the mismatch between the ratio of the amount of scrolling of each layer and scaling rates of each layer in a game using the orthographic projection method, by centrally managing parameters of the scrolling velocity and the parameters of the scaling rate of a layer (thus, controlling both in association with one another). Specifically, in the present embodiment, first, a parameter called "layer depth value" is configured individually for each layer in advance. The layer depth value is a value that indicates a front-to-back order of each layer in the depth direction and an interval between layers. Based on the layer depth value, a scaling rate (hereinafter, referred to as a basic scaling value) of each layer at a basic state (a state at the beginning of the game) is determined. In addition, based on this scaling value, a basic amount of scrolling (hereinafter, referred to as an amount of basic scrolling) of each layer is determined. Next, in a process in each single frame, a distance between the virtual camera and each layer is calculated (this distance is a distance obtained from a simulation that envisions the virtual camera being moved into or pulled out as described above). Next, based on the distance, the basic scaling of each layer is adjusted. Furthermore, based on the distance, the basic scaling velocity of each layer is adjusted. Then, based on the parameters obtained after these adjustments, scaling and the parallax scrolling control of each layer are conducted.

As described above, in the present embodiment, the parameters for scaling and the amount of scrolling are both determined based on the distance between the virtual camera and each layer. Thus, instead of separately managing and setting the parameters for scaling and the amount of scrolling, both are determined in close association to one another. With this, even when the orthographic projection method is used and when a parallax scrolling associated with scaling is conducted, a smooth parallax scrolling can be attained and an expression with a simulated sense of perspective with less sense of discomfort is made possible.

Furthermore, in the present embodiment, the following process is additionally conducted in order to further express the simulated depth perception. Namely, as a drawing model in the background (which is generated by being modeled as a 3D model as described above) approaches an end of the screen, the drawing model is rotated or transformed such that a side surface portion of the drawing model becomes visible (refer to FIG. 13 to FIG. 15). By conducting such a process, a smooth parallax scrolling can be executed without generating a sense of discomfort while further expressing a depth perception, even when using the orthographic projection method.

(Details of Game Process)

Figure 16:
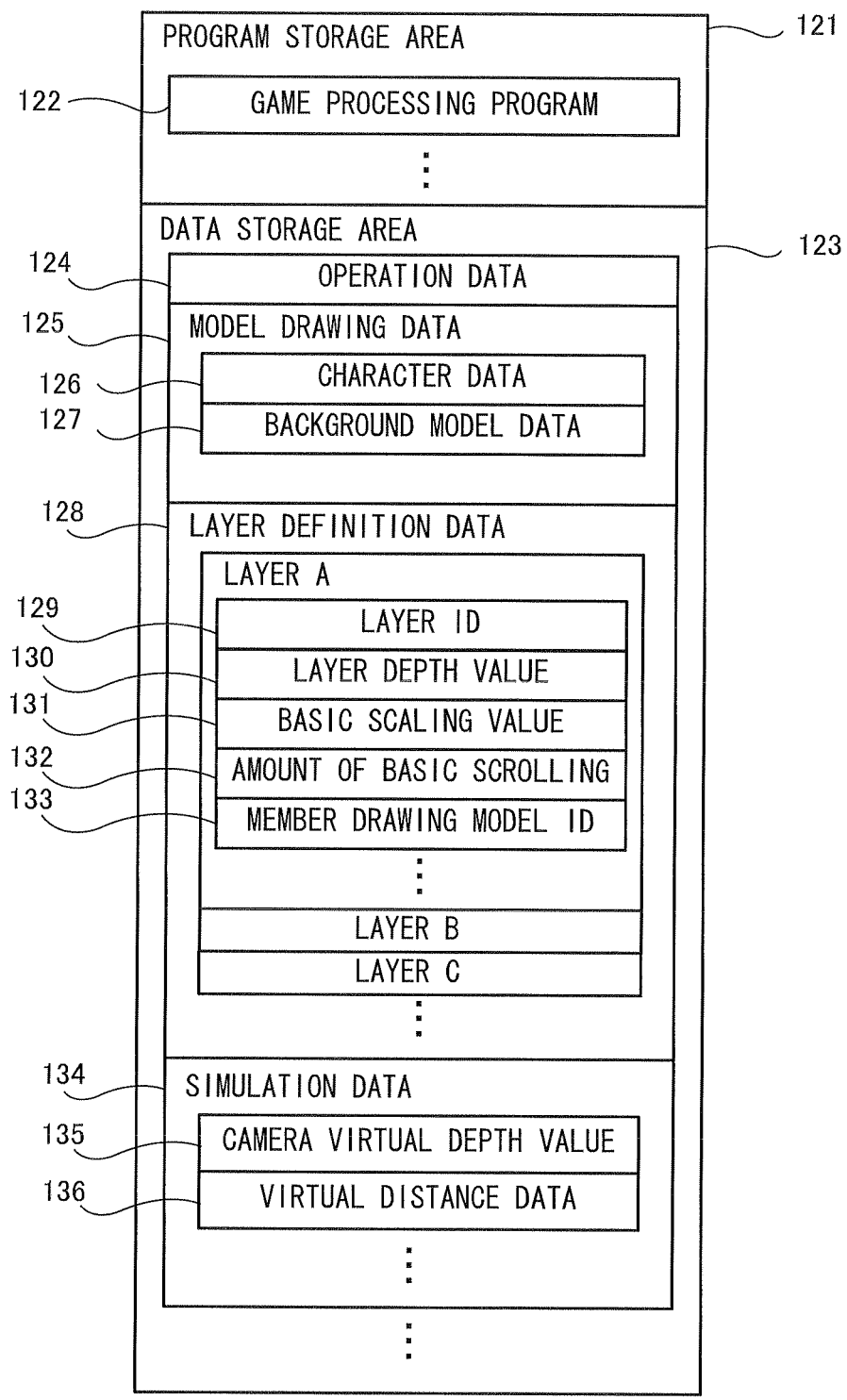
FIG. 16 is a figure showing a memory map of an external main memory 12 of the game apparatus 3.

Details of the game process executed by the game apparatus 3 will be described in the following. First, data that is stored on the external main memory 12 in the game process will be described. FIG. 16 is a figure showing a memory map of the external main memory 12 of the game apparatus 3. In FIG. 16, the external main memory 12 includes a program storage area 121 and a data storage area 123. Data in the program storage area 121 and the data storage area 123 are stored on the optical disc 4, and are transferred and stored on the external main memory 12 upon execution of the game program.

The program storage area 121 stores thereon a game processing program 122 which is executed by the CPU 10. The game processing program 122 is a program that corresponds to the processes in a flowchart of FIG. 18 which is described later.

The data storage area 123 stores data such as operation data 124, model drawing data 125, layer definition data 128, and simulation data 134, and stores various flags as appropriate.

The operation data 124 is operation data that is transmitted from the controller 7 to the game apparatus 3. The operation data 124 includes operation button data and the like. The operation button data is data representing an input state of each of the operation buttons of 72a to 72i. In the present embodiment, since the operation data is transmitted from the controller 7 to the game apparatus 3 at a rate of once every 1/200 seconds, the operation data 124 stored on the external main memory 12 is updated at this rate. In the present embodiment, the external main memory 12 may store only the latest (lastly acquired) operation data.

The model drawing data 125 is data representing various drawing models that appear in the game. The model drawing data 125 includes character data 126 and background model data 127. The character data 126 is data representing various objects having collision determination settings, such as the player characters 101, the enemy character 102, the block 103, and the like. The character data 126 is data representing objects that are central to the game play. In the present game, the character data 126 corresponds to data representing various drawing models that belong to the above described layer A.

The character data 126 includes an ID for uniquely identifying each of the characters, polygon data for generating a 3D model of each of the characters, texture data to be pasted on the 3D model, and the like.

The background model data 127 is drawing model data excluding the above described character data 126. Thus, background model data 127 is data which represents drawing models for the background (hereinafter, referred to as background models) and which does not have collision determination settings. The background models belong mainly in either one of the above described layer B, layer C, or layer D.

The layer definition data 128 is data related to each of the layers and includes definition data of each of the layers. The definition data of each of the layers include a layer ID 129, a layer depth value 130, a basic scaling value 131, an amount of basic scrolling 132, member drawing model IDs 133, and the like.

Figure 17:
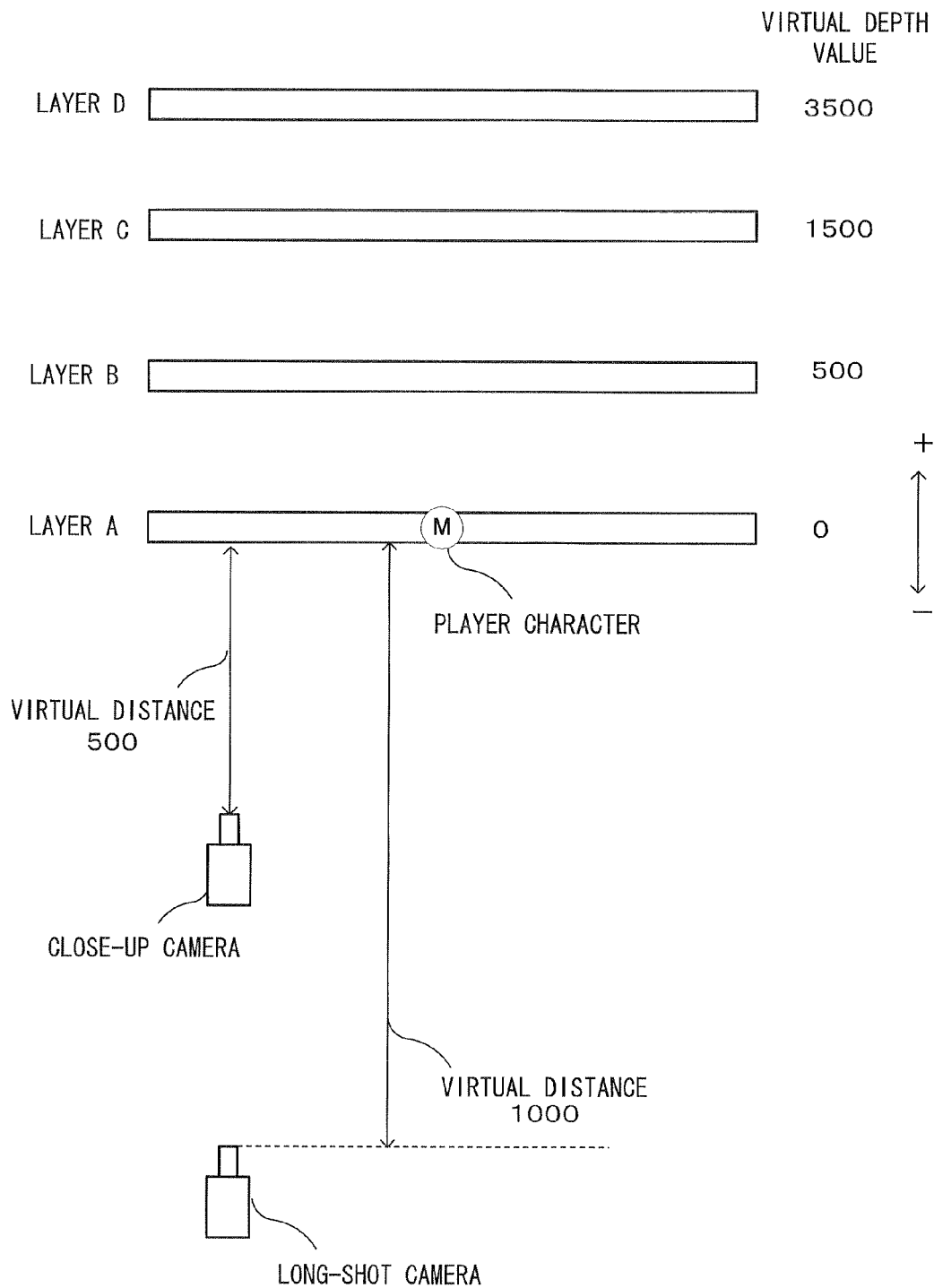
FIG. 17 is a figure schematically showing a relation between each layer and a position of a virtual camera in the present embodiment.

The layer ID 129 is an ID for identifying each of the layers. The layer depth value 130 is data defining a depth value of each of the layers. In the present embodiment, the depth value is configured as shown in FIG. 17. FIG. 17 is a figure schematically showing a relation between the positions of the virtual camera and each of the layers in the present embodiment. In the present embodiment, a virtual depth value of layer A is set as "0", a virtual depth value of layer B is set as "500", a virtual depth value of layer C is set as "1500", and a virtual depth value of layer D is set as "3500". A "close-up camera", a "long-shot camera", and the like in FIG. 17 will be described later.

The basic scaling value 131 is a value that indicates a scale of each of the layers in a game state in which scaling is not conducted. In other words, the basic scaling value 131 is a default scaling value of each of the layers.

The amount of basic scrolling 132 is an amount of scrolling of each of the layers per one frame in a game state in which scaling is not conducted.

The member drawing model IDs 133 are data representing drawing models that belong to each of the layers, and includes IDs for identifying each of the drawing models. For example, the member drawing model IDs 133 for layer A includes IDs representing the player characters 101, and IDs representing the enemy character 102, the block 103, and the like.

The simulation data 134 is data used when scaling a layer as described above. As described above, when calculating a scaling rate in the present embodiment, a movement of the virtual camera in the depth direction is simulated to obtain an answer for a question of "if the virtual camera has moved to this position, how large would the layer be displayed?" The simulation data 134 is data used in this simulation. The simulation data 134 includes a camera virtual depth value 135, virtual distance data 136, and the like.

The camera virtual depth value 135 is data representing a position of the virtual camera in the depth direction after the virtual camera has been moved by the simulation.

The virtual distance data 136 is data representing a distance to each of the layers from a position of the virtual camera indicated by the camera virtual depth value (thus, a position a camera when the camera has been assumed to be moved).

The game process executed by the game apparatus 3 will be described next with reference to FIG. 17 to FIG. 20. However, the following description centers on processes regarding scaling process of a layer and parallax scrolling, and detailed descriptions of other game processes are omitted.

In the game process of the present embodiment, first, the basic scaling value of each of the layers is determined as an initial process, based on the layer depth value 130 configured for each of the layers in advance. Furthermore, the amount of basic scrolling is determined based on the basic scaling value. Thus, the basic state of a layer is determined. For example, the game will start in a state where layer A is displayed at same-scale and layer B positioned behind layer A is displayed at a scaling rate of 0.5 times.

Then, in the processes executed in every frame, when scaling up or scaling down is conducted, a process of adjusting the basic scaling value and the amount of basic scrolling is executed as appropriate, by taking into consideration of the camera virtual depth value 135 of the virtual camera. In the following, a detailed description is provided by using the situation shown in FIG. 17 as an example for the relationship between each of the layers and the position of the virtual camera. Supplementary explanation of FIG. 17 will be provided here. Shown in FIG. 17 are two cameras, a "close-up camera" and a "long-shot camera". These cameras indicate positional limits within a movement range of the virtual camera in the depth direction. In FIG. 17, the "close-up camera" (corresponds to a zoomed-in state) is at a position having a virtual distance of 500 from layer A to which the player characters belong, and the "long-shot camera" (corresponds to a zoomed-out state) is at a position having a virtual distance of 1000 from layer A. This indicates that the virtual camera moves between virtual distances of 500 to 1000 in the present embodiment (however, only in the above described simulation). Therefore, one premise is that the virtual camera cannot approach a position having a virtual distance smaller than 500 from layer A, and another premise is that the virtual camera cannot move to a position having a virtual distance larger than 1000 from layer A.

Figure 18:
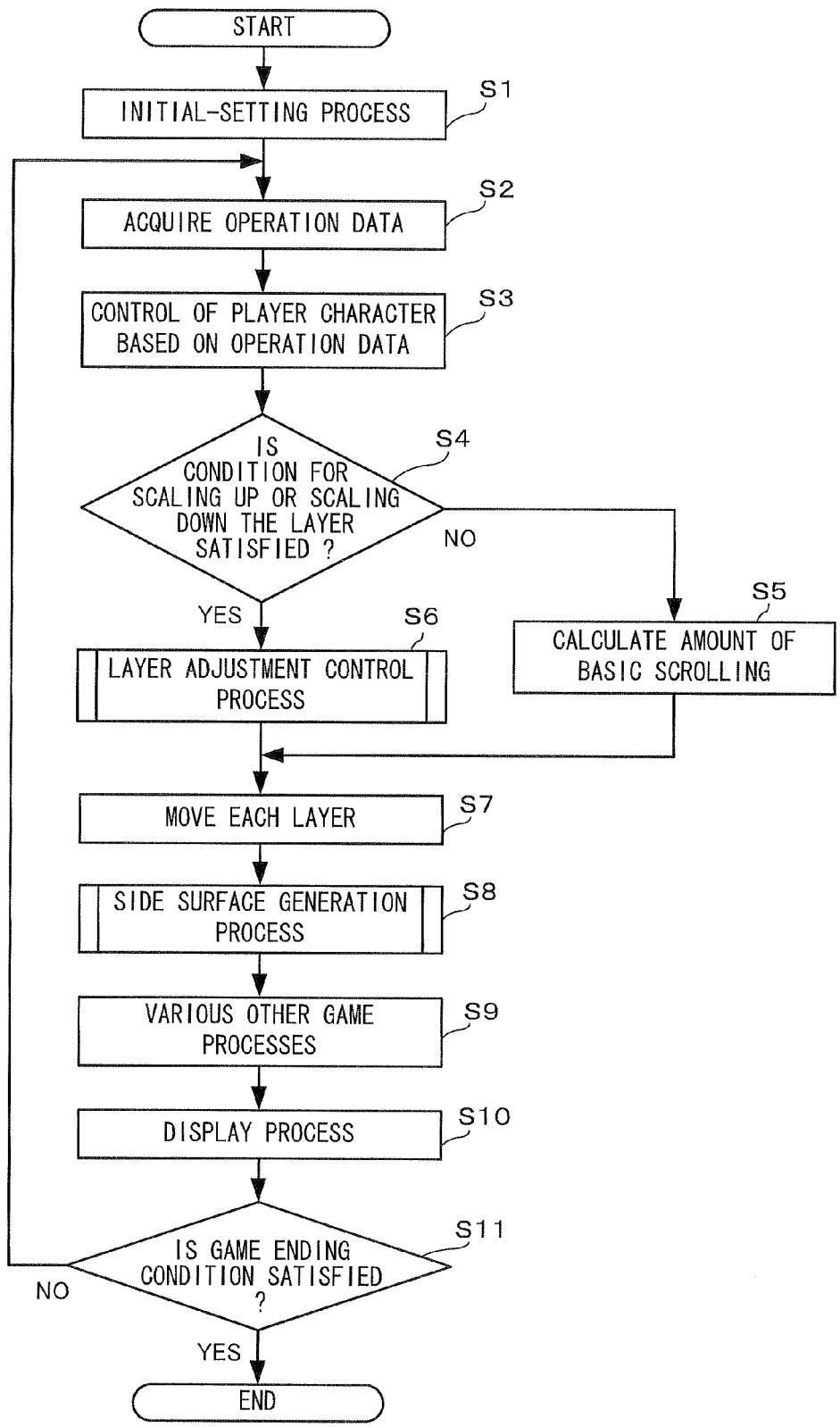
FIG. 18 is a flowchart showing details of a game process of the present embodiment.

Detailed description of the game process is provided in the following. When the power of the game apparatus 3 is turned on, the CPU 10 of the game apparatus 3 executes a start-up program stored on the ROM/RTC 13, and initialization of each unit such as the external main memory 12 is conducted. Then, a game program stored on the optical disc 4 is loaded onto the external main memory 12, and execution of the game program is initiated by the CPU 10. A flowchart shown in FIG. 18 is a flowchart showing game processes conducted after the completion of the above processes. A process loop from step S2 to step S11 shown in FIG. 18 is repeatedly executed in each frame.

First, at step S1, an initialization process is executed. Specifically, first, the layer definition data 128 is read-out from the external main memory 12, and the layer depth value 130 for each of the layers is acquired. As shown in FIG. 17, "0" is set for layer A, "500" is set for layer B, "1500" is set for layer C, and "3500" is set for layer D. Next, based on the layer depth value 130, the basic scaling value 131 of each of the layers is calculated and stored on the external main memory 12.

The basic scaling value is calculated, for example, by using the following formula.

Basic Scaling Value=Close-Up Camera Virtual Distance/(Layer Depth Value+Close-Up Camera Virtual Distance)     Formula 1

By applying the above described numerical examples, the resulting basic scaling value 131 is calculated as, "1" for layer A, "0.5" for layer B, "0.25" for layer C, and "0.125" for layer D.

Next, the layers are respectively scaled down based on the basic scaling value 131 calculated for respective layers. Then the layers are respectively arranged within the virtual game space as appropriate. Next, the virtual camera is arranged at a predetermined position (for example, a position having a virtual distance of 750 from layer A). Then an image of the virtual game space taken by the virtual camera using the orthographic projection method is generated and displayed as a game image.

Furthermore, an "adjustment function" which is used in the following process is configured and stored on the external main memory 12 as appropriate. The "adjustment function" is a function indicating a correlation between distance ranging between the "close-up camera" and the "long-shot camera", and possible scaling value of each of the layers ranging from a maximum value to a minimum value. A possible maximum scaling value for each of the layers is a scaling value of a layer when the virtual camera is at the position of the "close-up camera". Furthermore, a possible minimum scaling value of each of the layers is a scaling value of a layer when the virtual camera is at the position of the "long-shot camera". The maximum value and minimum value can be obtained, for example, by using the following formulae.

Layer Scale Value when Close-Up Camera Position is used=Close-Up Camera Distance/(Layer Depth Value+Close-Up Camera Distance)  Formula 2

Layer Scale Value when Long-Shot Camera Position is used=Close-Up Camera Distance/(Layer Depth Value+Long-Shot Camera Distance)  Formula 3

From the above described formulae, for example, scaling values for layer A are values ranging from 1 to 0.5. Then the function indicating the correlation between the virtual distance and the scaling value is configured as appropriate (for example, in the case with layer A, the function returns a scaling value of "1" if a parameter of a virtual distance of 500 is provided).

Furthermore, in the initial-setting process, other than initial settings regarding the layers as described above, various initial settings regarding game processes are also conducted as appropriate.

After the completion of the above described initial-setting processes, the operation data 124 is acquired at step S2. In the following step S3, behaviors (movement and the like) of the player characters 101 are controlled based on the operation data 124. Additionally, behavior of the enemy character is also controlled as appropriate.

Next, at step S4, it is determined whether or not a condition of scaling up or scaling down has been satisfied resulting from the movements of the player characters 101. In the present embodiment, for example, if a distance between the multiple player characters is equal to or smaller than a first distance, a scaling up process is conducted on the layer in accordance with the distance. In addition, if a distance between the multiple player characters is equal to or larger than a second distance, a scaling down process is conducted on the layer in accordance with the distance.

As a result of the determination at step S4, if the condition of scaling up or scaling down is not satisfied (NO at step S4), at step S5, the amount of basic scrolling 132 is calculated for each of the layers. In the present embodiment, since the screen is scrolled in accordance with the movement velocities of the player characters 101, the amount of basic scrolling 132 is calculated, for example, by using the following formula.

Amount of Basic Scrolling=Movement Velocity of Player Character×Basic Scaling Value  Formula 4

Then, the process is advanced to step S7 which is described later.

Figure 19:
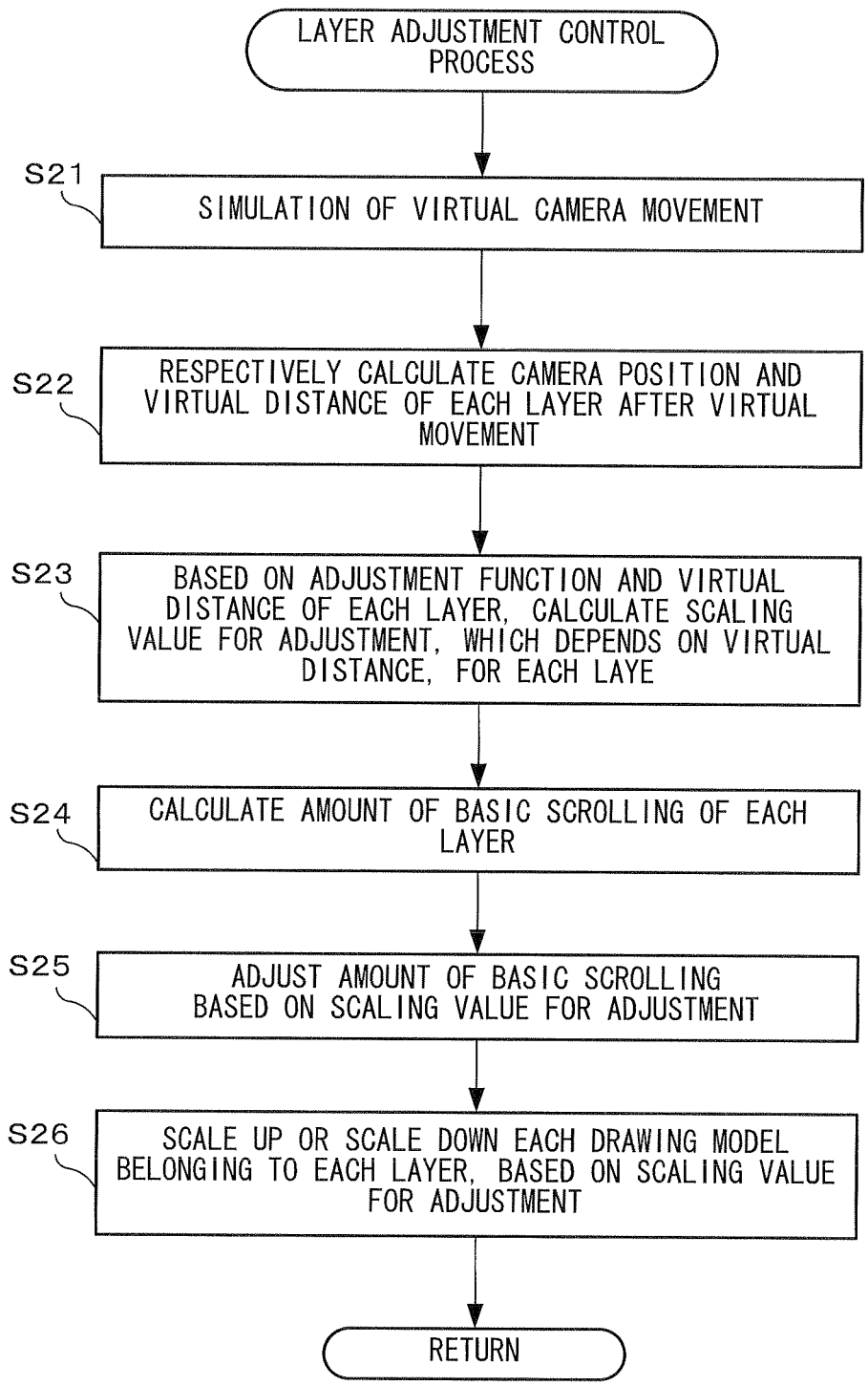
FIG. 19 is a flowchart showing details of a layer adjustment control process shown in step S6 of FIG. 18.

On the other hand, if the condition of scaling up or scaling down the layer is satisfied (YES at step S4), a layer adjustment control process is executed next at step S6. FIG. 19 is a flowchart showing details of the layer adjustment control process shown in step S6. In FIG. 19, first, a simulation of a movement of the virtual camera is conducted at step S21. For example, the virtual camera is moved in the depth direction for a distance that depends on a distance between the multiple player characters, and the obtained position of the virtual camera is stored as the camera virtual depth value 135. Then, the virtual camera can be return to the position before the movement. Furthermore, in another processing example, first, an amount of movement of the virtual camera in the depth direction is calculated based on the distance between the multiple player characters (the amount of movement is calculated but the virtual camera is not actually moved). Then, the camera virtual depth value 135 may be calculated by taking into account of the calculated amount of movement to the current position of the virtual camera.

Next, at step S22, the camera virtual depth value 135 (which is the position of the virtual camera after the virtual camera is moved virtually) and the virtual distance between each of the layers are respectively calculated. For example, when described with the example in FIG. 17, if the camera virtual depth value 135 indicates a distance of 800 for layer A, the virtual distance for layer A is calculated as 800, and the virtual distance for layer B is calculated as 1300.

Next, at step S23, a scaling value for adjustment is calculated for each of the layers based on the virtual distances calculated for each of the layers and on the "adjustment function" corresponding to each of the layers. As a result, the scaling value for adjustment, which is a scaling value that takes into consideration of the degree of "close-up" or "long-shot" of the camera to the basic scaling value 131 of each of the layers, is calculated. For example, a scaling value in accordance with the virtual distance of 800 is calculated for layer A, and a scaling value in accordance with the virtual distance of 1300 is calculated for layer B.

Next, at step S24, based on the basic scaling value 131, an amount of basic scrolling is calculated for each of the layers. This process is a process similar to that at step S5.

Next, at step S25, the amount of basic scrolling is adjusted based on the scaling value for adjustment. As a result, the amount of scrolling (hereinafter, referred to as an amount of scrolling after adjustment), which takes into consideration of the degree of "close-up" or "long-shot" of the virtual camera, is calculated.

Next, at step S26, each of the drawing models belonging to each of the layers is scaled up or scaled down as appropriate based on the scaling value for adjustment. With the above, the layer adjustment control process ends.

Returning to FIG. 18, next at step S7, moving (scrolling) of each of the layers is conducted. With regard to the amount of movement (amount of scrolling) of a layer, if it is determined as NO at step S4 (that is, a mode in which scaling up or scaling down is not conducted), the movement of each of the layers is conducted based on the amount of basic scrolling 132 of each of the layers. Furthermore, if it is determine as YES at step S4 (that is, a mode in which scaling up or scaling down is conducted), the movement of each of the layers is conducted based on the amount of scrolling after adjustment, which is adjusted by taking into consideration of the degree of "close-up" or "long-shot" of the virtual camera as described above.

Figure 20:
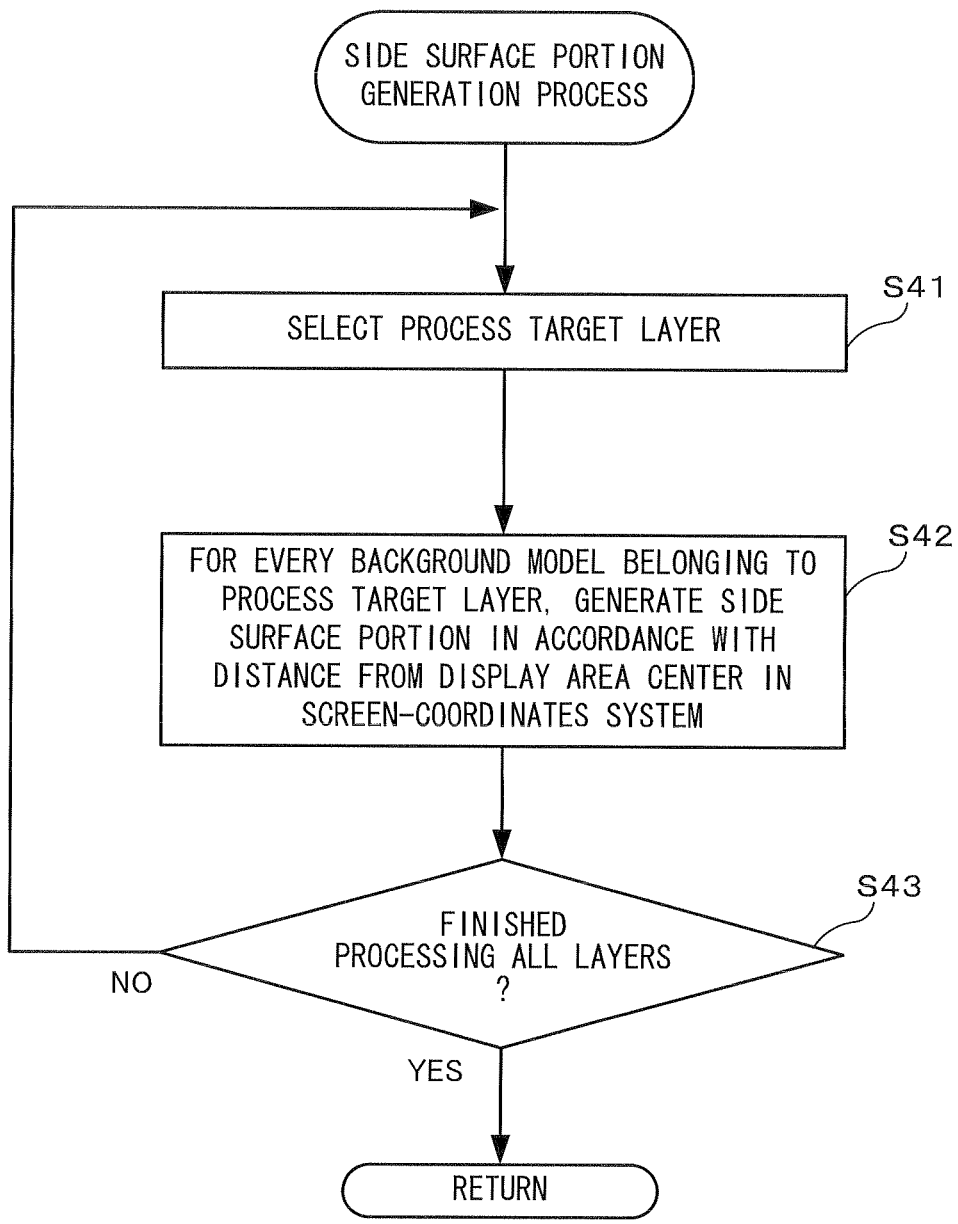
FIG. 20 is a flowchart showing details of a side surface generation process shown in step S8 of FIG. 18.

Next, at step S8, a side surface generation process is conducted. This process is a process to show a side surface portion of a background model that approached an end of the screen as a result of the movement of the layer. FIG. 20 is a flowchart showing details of the side surface generation process shown in step S8. In FIG. 20, first, at step S41, among the layers to which the player characters 101 do not belong (layers B to D in the present embodiment), one layer (process target layer) is selected as a target for the following process.

Next, at step S42, generation of each of the side surface portions of drawing models belonging to the process target layer is conducted. For example, a process described next is conducted. First, a distance from a center position of X-axis in a screen-coordinates system (that is, a center of the display area) to a drawing model is calculated. Next, the drawing model is rotated in accordance with the distance such that the side surface portion of the drawing model is caught by the virtual camera. Furthermore, since a position having a longer distance from the center position can be considered as being close to an end of the screen, the larger the distance from the center position is the more a model is rotated. As a result, a simulated sense of perspective can be expressed.

Next, at step S43, it is determined whether or not the process has been executed for all the layers to which the player characters 101 do not belong. As a result, if there is still an unprocessed layer remaining (NO at step S43), the process returns to step S41 described above, and the processes are repeated. When all the layers have been processed (YES at step S43), the side surface portion generation process ends.

Returning to FIG. 18, next, at step S9, other game processes are executed. For example, collision determination and various processes associated resulting from the collision determination are executed.

Next, at step S10, a game image taken by the orthographic projection method of a virtual game space reflecting the processes described above is generated and displayed.

Next, at step S11, it is determined whether or not a condition for ending the game is satisfied, and if it is not satisfied (NO at step S11), the process returns to step S2 described above, and the processes are repeated. On the other hand, if it is satisfied (YES at step S11), the game process ends. The description of the game process of the present embodiment ends here.

As described above, in the present embodiment, the scale (scaling rate) and the amount of scrolling of each of the layers are both determined based on the distance (which is calculated by a simulation in the above described embodiment) between each of the layers and the position of the virtual camera at the time of scaling. As a result, even in a game that uses the orthographic projection method and parallax scrolling and even when accompanied with a scaling process of the screen, production of a smooth zoom-in and zoom-out and parallax scrolling without a sense of discomfort can be achieved, and a simulated sense of perspective can be expressed.

Note that, in the above described embodiment, an example in which the respective layers are arranged in the virtual space in a sequential order according to the layer depth value has been described; however, the arrangement positions may not necessarily be arranged in this sequential order. For example, drawing sequence of each of the layers may be controlled based on the layer depth value. Which means, controls may be conducted such that a layer having the largest layer depth value is drawn at the beginning and a layer having the smallest layer depth value is drawn at the very end of the drawing sequence.

Furthermore, in the above described embodiment, an example in which the virtual camera is arranged in the virtual three-dimensional space has been described; however, the virtual camera may not necessarily be used, and a process of generating an image obtained by orthographically projecting the above described layers and the like from a predetermined reference point set within the virtual three-dimensional space may be conducted.

Furthermore, the program for executing the processes of the present embodiment as described above can be stored on any computer readable storage medium (for example, a flexible disk, a hard disk, an optical disc, a magneto-optical disk, a CD-ROM, a CD-R, a magnetic tape, a semiconductor memory card, a ROM, a RAM, and the like).

Furthermore, in the embodiment described above, a case has been described where a series of processes are executed on a single apparatus (the game apparatus 3) in order to determine both the scale (scaling rate) and the amount of scrolling of each of the layers in accordance with the distance between each of the layers and the position of the virtual camera at the time of scaling. However, in another embodiment, the series of processes may be executed on an information processing system including a plurality of information processing devices. For example, in an information processing system including a terminal side device and a server side device which can communicate with the terminal side device via a network, some of the processes among the above described series of processes may be executed on the server side device. Furthermore, in an information processing system including a terminal side device and a server side device which can communicate with the terminal side device via a network, the main processes of the series of processes may be executed on the server side device, and some of the processes may be executed on the terminal side device. Still further, in the above described information processing system, the system on the server side may include a plurality of information processing devices, and processes that should be executed on the server side may be distributed among the plurality of information processing devices for execution.

While the technology presented herein has been described in detail, the foregoing description is in all aspects illustrative and not restrictive. It will be understood that numerous other modifications and transforms can be devised without departing from the scope of the present technology.

What is claimed is:

1. A non-transitory computer readable storage medium having stored thereon an image processing program executed by a computer of an image processing apparatus which displays an image obtained by orthographic projection transformation of a virtual three-dimensional space configured and arranged with a plurality of layers which are each scrolling control targets for a parallax scrolling, the image processing program causing the computer to perform at least:
layer scaling rate calculating for calculating, for each of the layers, a scaling rate of a three-dimensional object image or a three-dimensional background image belonging to each of the layers, in accordance with a distance from a predetermined reference point in the virtual three-dimensional space to each of the layers;

layer movement velocity calculating for calculating, for each of the layers, a movement velocity of each of the layers when conducting the parallax scrolling, based on said distance from the predetermined reference point in the virtual three-dimensional space to each of the layers; and layer controlling for scaling, up or down, an image in each of the layers based on the calculated scaling rate, while maintaining the size of each of the layers, and for moving each of the layers in a predetermined direction at the calculated movement velocity, wherein a virtual camera is simulated to be arranged at the predetermined reference point, and the layer scaling rate calculating calculates the scaling rate in accordance with the distance from the simulated arrangement position of the virtual camera to each of the layers, wherein the ratio of the movement velocity at two different layers in the virtual three-dimensional space is equal to the ratio of the scaling rate at said two different layers, wherein, the dependence of the movement velocity of each of the layers when conducting the parallax scrolling on the distance from the predetermined reference point is the same as the dependence of the scaling rate of a three-dimensional object image or a three-dimensional background image belonging to each of the layers on the distance from the predetermined reference point, and wherein the size of said image obtained by orthographic projection transformation of a virtual three-dimensional space is maintained during said layer controlling and said moving each of the layers.

2. The non-transitory computer readable storage medium having stored thereon the image processing program according to claim 1, wherein
the layer movement velocity calculating calculates the movement velocity such that a layer arranged closer to the predetermined reference point has a faster movement velocity.

3. The non-transitory computer readable storage medium having stored thereon the image processing program according to claim 1, wherein
the layer movement velocity calculating calculates the movement velocity such that a layer arranged closer to the predetermined reference point has a faster movement velocity and such that a layer arranged farther from the predetermined reference point has a slower movement velocity.

4. The non-transitory computer readable storage medium having stored thereon the image processing program according to claim 1, wherein
the layer scaling rate calculating calculates the scaling rate such that a layer arranged closer to the predetermined reference point has a larger scaling rate when being scaled-up or a smaller scaling rate when being scaled-down.

5. The non-transitory computer readable storage medium having stored thereon the image processing program according to claim 1, wherein,
the layer scaling rate calculating calculates the scaling rate such that a layer arranged closer to the predetermined reference point is further scaled up and such that a layer arranged farther from the predetermined reference point is further scaled down.

6. The non-transitory computer readable storage medium having stored thereon the image processing program according to claim 1, wherein:
the image processing program further causes the computer to perform reference point moving for moving the predetermined reference point in one predetermined direction or for assuming that the predetermined reference point has been moved in one predetermined direction, if a predetermined condition based on an operation by an operator is satisfied;
the layer scaling rate calculating calculates the scaling rate based on a distance from each of the layers to a position of the predetermined reference point moved by the reference point moving or to a position of the predetermined reference point which is assumed to have been moved; and
the layer movement velocity calculating calculates the movement velocity of each of the layers based on a distance from each of the layers to the position of the predetermined reference point moved by the reference point moving or the position of the predetermined reference point which is assumed to have been moved.

7. The non-transitory computer readable storage medium having stored thereon the image processing program according to claim 1, wherein
a depth value which indicates a position of each of the layers in the virtual space on an axis in one predetermined direction from the predetermined reference point is configured;
the layer scaling rate calculating calculates the scaling rate of the three-dimensional object image or the three-dimensional background image based on the depth value; and
the layer movement velocity calculating calculates the movement velocity of each of the layers based on the depth value.

8. The non-transitory computer readable storage medium having stored thereon the image processing program according to claim 1, wherein
an image processing executed by the image processing apparatus is a processing capable of moving an object to an end of a display area which is an area in which an image is displayed.

9. The non-transitory computer readable storage medium having stored thereon the image processing program according to claim 1, wherein
the layer movement velocity calculating calculates the movement velocity of each of the layers based on the distance from the virtual camera to each of the layers.

10. The non-transitory computer readable storage medium having stored thereon the image processing program according to claim 1, wherein
the image processing program further causes the computer to perform object side-surface generating for changing, when a three-dimensional object that belongs to a layer approaches an end of a display area in which an image is displayed, an image of the three-dimensional object such that a side surface of the three-dimensional object is displayed.

11. The non-transitory computer readable storage medium having stored thereon the image processing program according to claim 10, wherein
the object side-surface generating transforms the three-dimensional object such that a side surface portion of the three-dimensional object is displayed, or rotates the three-dimensional object along a movement direction of the layer such that a side surface of the three-dimensional object is displayed.

12. An image processing apparatus which displays an image obtained by orthographic projection transformation of a virtual three-dimensional space configured and arranged with a plurality of layers which are each scrolling control targets for a parallax scrolling, the image processing apparatus comprising a computer configured to perform at least:
calculating, for each of the layers, a scaling rate of a three-dimensional object image or a three-dimensional background image belonging to each of the layers, in accordance with a distance from a predetermined reference point in the virtual three-dimensional space to each of the layers;
calculating, for each of the layers, a movement velocity of each of the layers when conducting the parallax scrolling, based on said distance from the predetermined reference point in the virtual three-dimensional space to each of the layers; and
scaling, up or down, an image in each of the layers based on the calculated scaling rate, while maintaining the size of each of the layers, and moving each of the layers in a predetermined direction at the calculated movement velocity, wherein
a virtual camera is simulated to be arranged at the predetermined reference point, and the calculating, for each of the layers, a scaling rate, calculates the scaling rate in accordance with the distance from the simulated arrangement position of the virtual camera to each of the layers, wherein
the ratio of the movement velocity at two different layers in the virtual three-dimensional space is equal to the ratio of the scaling rate at said two different layers, wherein,
the dependence of the movement velocity of each of the layers when conducting the parallax scrolling on the distance from the predetermined reference point is the same as the dependence of the scaling rate of a three-dimensional object image or a three-dimensional background image belonging to each of the layers on the distance from the predetermined reference point, and wherein
the size of said image obtained by orthographic projection transformation of a virtual three-dimensional space is maintained during said scaling and said moving each of the layers.

13. An image processing method to be executed in an information processing system comprising an image processing apparatus and a display for displaying an image obtained by orthographic projection transformation of a virtual three-dimensional space configured and arrange with a plurality of layers which are each scrolling control targets for a parallax scrolling, wherein the image processing apparatus performs:
layer scaling rate calculation for calculating, for each of the layers, a scaling rate of a three-dimensional object image or a three-dimensional background image belonging to each of the layers, in accordance with a distance from a predetermined reference point in the virtual three-dimensional space to each of the layers;
layer movement velocity calculation for calculating, for each of the layers, a movement velocity of each of the layers when conducting the parallax scrolling, based on said distance from the predetermined reference point in the virtual three-dimensional space to each of the layers; and
layer control for scaling, up or down, an image in each of the layers based on the calculated scaling rate, while maintaining the size of each of the layers, and moving each of the layers in a predetermined direction at the calculated movement velocity, wherein
a virtual camera is simulated to be arranged at the predetermined reference point, and the layer scaling rate calculation calculates the scaling rate in accordance with the distance from the simulated arrangement position of the virtual camera to each of the layers, wherein
the ratio of the movement velocity at two different layers in the virtual three-dimensional space is equal to the ratio of the scaling rate at said two different layers, wherein,
the dependence of the movement velocity of each of the layers when conducting the parallax scrolling on the distance from the predetermined reference point is the same as the dependence of the scaling rate of a three-dimensional object image or a three-dimensional background image belonging to each of the layers on the distance from the predetermined reference point, and wherein
the size of said image obtained by orthographic projection transformation of a virtual three-dimensional space is maintained during said layer control and said moving each of the layers.

14. An image processing system including an image processing apparatus and a display which displays an image obtained by orthographic projection transformation of a virtual three-dimensional space configured and arranged with a plurality of layers which are each scrolling control targets for a parallax scrolling, the image processing system comprising a computer configured to perform at least:
calculating, for each of the layers, a scaling rate of a three-dimensional object image or a three-dimensional background image belonging to each of the layers, in accordance with a distance from a predetermined reference point in the virtual three-dimensional space to each of the layers;
calculating, for each of the layers, a movement velocity of each of the layers when conducting the parallax scrolling, based on said distance from the predetermined reference point in the virtual three-dimensional space to each of the layers; and
scaling, up or down, an image in each of the layers based on the calculated scaling rate, while maintaining the size of each of the layers, moving each of the layers in a predetermined direction at the calculated movement velocity, wherein
a virtual camera is simulated to be arranged at the predetermined reference point, and the calculating, for each of the layers, a scaling rate, calculates the scaling rate in accordance with the distance from the simulated arrangement position of the virtual camera to each of the layers, wherein
the ratio of the movement velocity at two different layers in the virtual three-dimensional space is equal to the ratio of the scaling rate at said two different layers, wherein,
the dependence of the movement velocity of each of the layers when conducting the parallax scrolling on the distance from the predetermined reference point is the same as the dependence of the scaling rate of a three-dimensional object image or a three-dimensional background image belonging to each of the layers on the distance from the predetermined reference point, and wherein the size of said image obtained by orthographic projection transformation of a virtual three-dimensional space is maintained during said scaling and said moving each of the layers.

* * * * *